United States Patent
Shirota et al.

(10) Patent No.: US 10,235,049 B2
(45) Date of Patent: Mar. 19, 2019

(54) DEVICE AND METHOD TO MANAGE ACCESS METHOD FOR MEMORY PAGES

(71) Applicant: Kabushiki Kaisha Toshiba, Minato-ku (JP)

(72) Inventors: Yusuke Shirota, Yokohama (JP); Tatsunori Kanai, Yokohama (JP); Satoshi Shirai, Kawasaki (JP); Shiyo Yoshimura, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 44 days.

(21) Appl. No.: 15/678,226

(22) Filed: Aug. 16, 2017

(65) Prior Publication Data

US 2018/0260127 A1    Sep. 13, 2018

(30) Foreign Application Priority Data

Mar. 9, 2017    (JP) .................................. 2017-045240

(51) Int. Cl.
  *G06F 3/06*    (2006.01)
  *G06F 12/02*   (2006.01)

(52) U.S. Cl.
  CPC .......... *G06F 3/0607* (2013.01); *G06F 3/0614* (2013.01); *G06F 3/0655* (2013.01); *G06F 3/0688* (2013.01); *G06F 12/0246* (2013.01)

(58) Field of Classification Search
  CPC .... G06F 3/0614; G06F 3/0655; G06F 3/0688; G06F 12/0246

(Continued)

(56) References Cited

U.S. PATENT DOCUMENTS

| | | | |
|---|---|---|---|
| 2013/0339570 A1* | 12/2013 | Franceschini | G06F 12/0246 711/102 |
| 2014/0126289 A1* | 5/2014 | Burger | G06F 11/1072 365/185.03 |

(Continued)

FOREIGN PATENT DOCUMENTS

JP    2008-146255    6/2008

OTHER PUBLICATIONS

R.F. Freitas, et al. "Storage-class memory: The next storage system technology", IBM Journal of Research and Development, 2008, vol. 52, No. 4, 9 pages.

*Primary Examiner* — Than Nguyen
(74) *Attorney, Agent, or Firm* — Oblon, McClelland, Maier & Neustadt, L.L.P.

(57) ABSTRACT

A management device according to an embodiment manages reading and writing of data, by a processing circuit, from and into a first memory unit and a non-volatile memory unit containing a plurality of pages, and includes a setting storage unit, an access processing circuit, and a management circuit. The setting storage unit stores an access method indicating whether first access processing of writing and reading data into and from data transferred to the first memory unit from the non-volatile memory unit or second access processing of directly writing and reading data into and from data stored in the non-volatile memory unit is executed for each of the pages. The management circuit changes the access method for a third page on which the second access processing is set to be performed to the first access processing when quality of the third page is equal to or lower than a reference value.

18 Claims, 22 Drawing Sheets

(58) Field of Classification Search
USPC .......................................................... 711/103
See application file for complete search history.

(56) References Cited

U.S. PATENT DOCUMENTS

| 2016/0041760 A1* | 2/2016 | Kuang ............... G11C 16/3495 |
| | | 711/103 |
| 2018/0024877 A1* | 1/2018 | Gold .................. G11C 11/5628 |
| | | 714/773 |

* cited by examiner

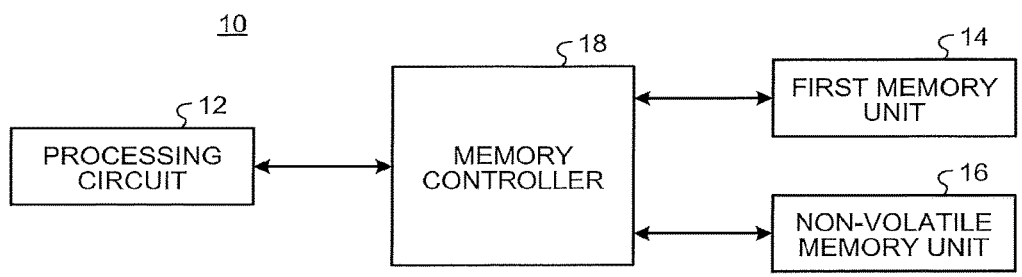
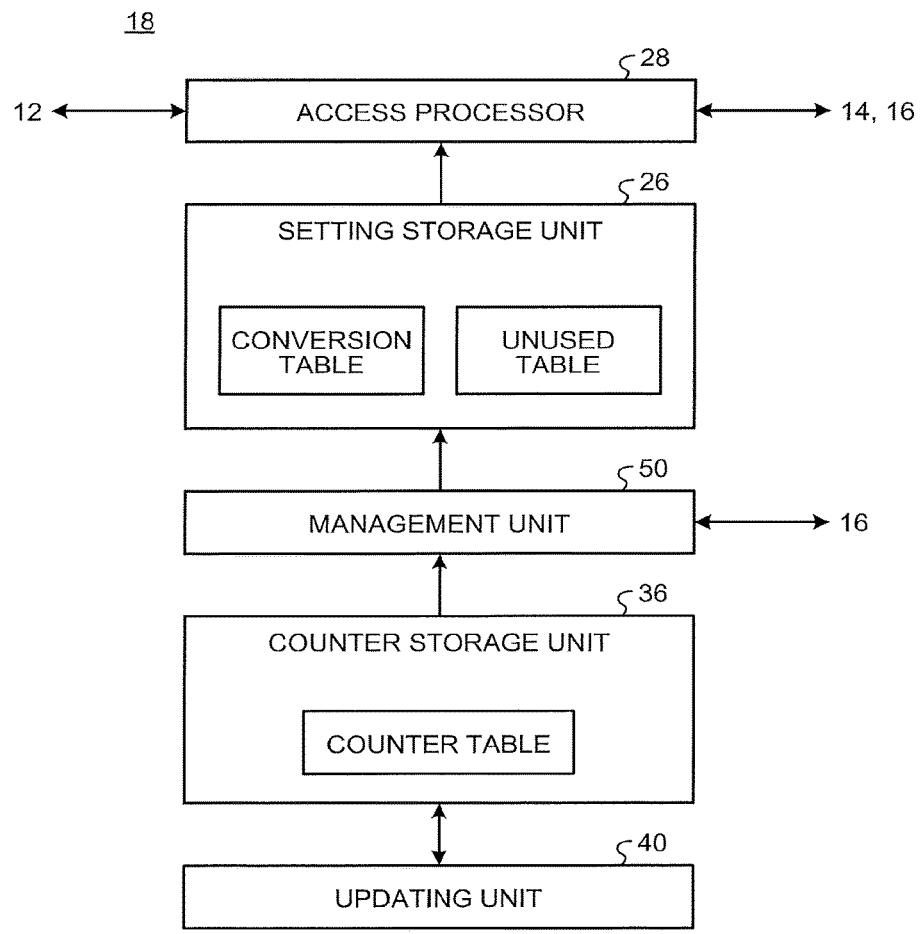

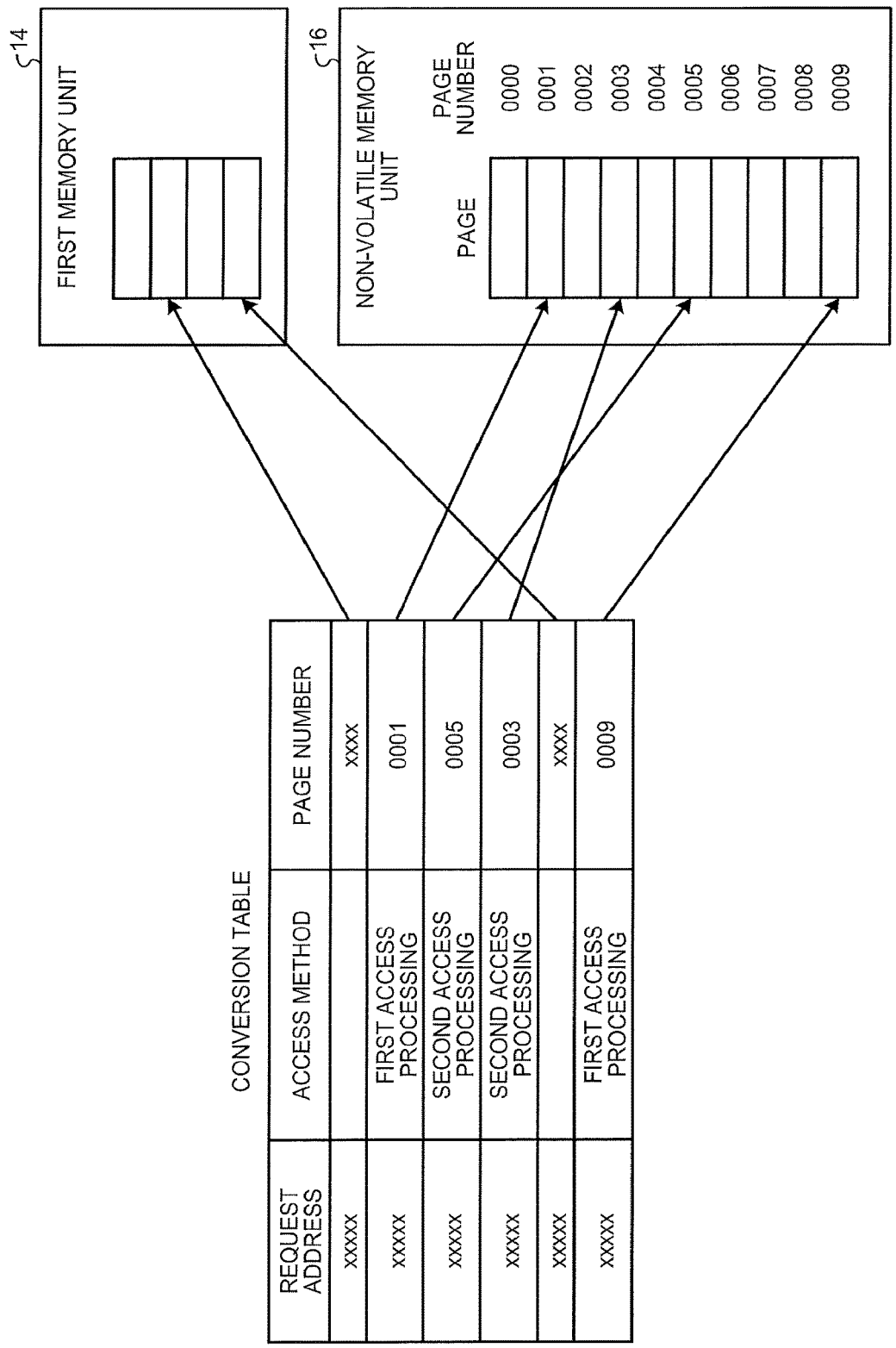

| PAGE NUMBER | ACCESS METHOD |
|---|---|
| 0000 | FIRST ACCESS PROCESSING |
| 0002 | FIRST ACCESS PROCESSING |
| 0004 | SECOND ACCESS PROCESSING |
| 0006 | FIRST ACCESS PROCESSING |
| 0007 | FIRST ACCESS PROCESSING |
| 0008 | SECOND ACCESS PROCESSING |
| ⋮ | ⋮ |

| PAGE NUMBER | COUNTER VALUE (NUMBER OF TIMES OF REWRITING) |
|---|---|
| 0000 | 2 |
| 0001 | 3 |
| 0002 | 0 |
| 0003 | 1 |
| ⋮ | ⋮ |
| xxxx | 5 |

FIG.14

| PAGE NUMBER/SUB PAGE NUMBER | ACCESS METHOD |
|---|---|
| 0003/ENTIRE | FIRST ACCESS PROCESSING |
| 0002/3 | FIRST ACCESS PROCESSING |
| 0004/0 | SECOND ACCESS PROCESSING |
| 0004/1 | FIRST ACCESS PROCESSING |
| 0004/2 | FIRST ACCESS PROCESSING |
| 0004/3 | SECOND ACCESS PROCESSING |
| ⋮ | ⋮ |

FIG.22

MANAGEMENT TABLE

| ENTRY NUMBER | PAGE NUMBER (IDENTIFICATION INFORMATION) | MAP INFORMATION CACHE LINE NUMBER | | | | | | |
|---|---|---|---|---|---|---|---|---|
| | | 0 | 1 | 2 | 3 | 4 | 5 | ......... |
| 0 | 5 | 0 | 1 | 1 | 0 | 0 | 1 | ......... |
| 1 | 2 | 1 | 0 | 0 | 0 | 0 | 0 | ......... |
| 2 | 12 | 0 | 0 | 0 | 0 | 1 | 0 | ......... |
| 3 | 3 | 0 | 0 | 1 | 0 | 0 | 0 | ......... |
| ⋮ | ⋮ | | | | | | | |
| 63 | 4 | 0 | 0 | 1 | 0 | 0 | 1 | ......... |

DEVICE AND METHOD TO MANAGE ACCESS METHOD FOR MEMORY PAGES

CROSS-REFERENCE TO RELATED APPLICATIONS

This application is based upon and claims the benefit of priority from Japanese Patent Application No. 2017-045240, filed on Mar. 9, 2017; the entire contents of which are incorporated herein by reference.

FIELD

Embodiments described herein relate generally to a management device, an information processing apparatus, and a management method.

BACKGROUND

Non-volatile memories such as a NAND flash have small numbers of rewritable times. An information processing apparatus including a non-volatile memory therefore performs wear-leveling control on the non-volatile memory. The information processing apparatus manages the number of times of data rewriting by a page unit and averagely writes pieces of data into a plurality of pages contained in the non-volatile memory. The information processing apparatus can thereby extend the lifetime of the non-volatile memory.

In recent years, high-speed non-volatile memories, which are also referred to as storage class memories, have been developed. The storage class memories enable not only data rewriting by a page unit but also data rewriting by, for example, a byte unit that is a smaller unit than the page.

With the storage class memory, when data rewriting is concentrated on a specific byte, the number of times of rewriting of a page containing the byte is increased regardless of the small number of times of rewriting into other bytes in the page. The information processing apparatus including the storage class memory therefore needs to efficiently access the storage class memory so as not to cause rewriting to be concentrated on a specific byte in a page.

BRIEF DESCRIPTION OF THE DRAWINGS

FIG. 1 is a diagram illustrating the configuration of the information processing apparatus according to a first embodiment;

FIG. 2 is a diagram illustrating the configuration of a memory controller in the first embodiment;

FIG. 3 is a diagram illustrating an example of a conversion table in the first embodiment;

FIG. 14 is a diagram illustrating an example of an unused table in the third embodiment;

FIG. 22 is a diagram illustrating an example of a management table;

DETAILED DESCRIPTION

Figures 4, 5:
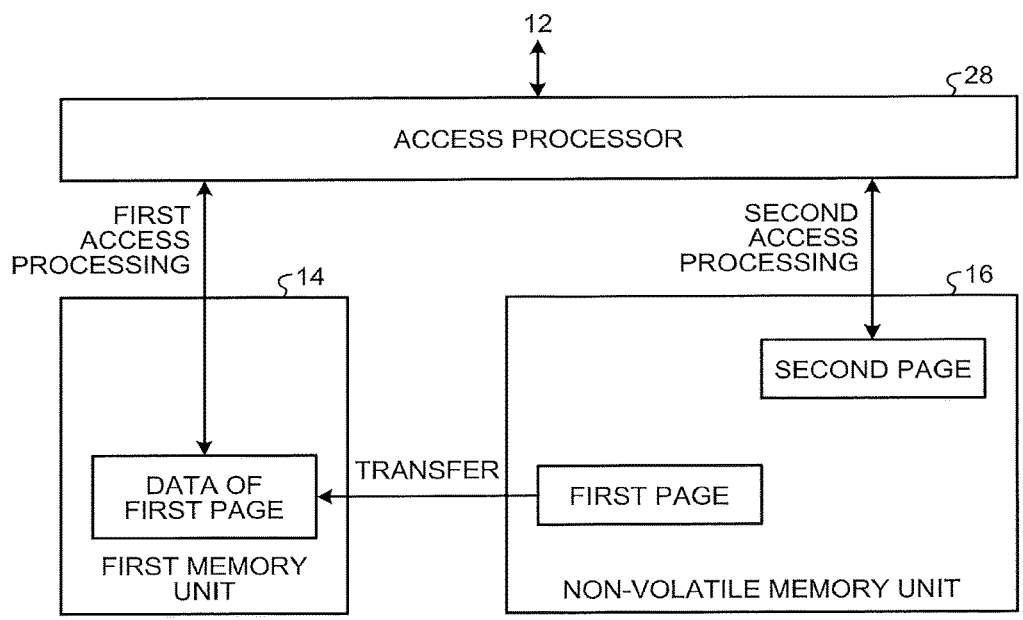
FIG. 4 is a diagram illustrating an example of an unused table in the first embodiment.
FIG. 5 is a diagram illustrating contents of first access processing and second access processing.

According to an embodiment, a management device that manages reading and writing of data, by a processing circuit, from and into a first memory unit and a non-volatile memory unit containing a plurality of pages, the management device includes a setting storage unit, an access processing circuit, and a management circuit. The setting storage unit is configured to store therein an access method indicating whether first access processing of writing and reading data into and from data transferred to the first memory unit from the non-volatile memory unit or second access processing of directly writing and reading data into and from data stored in the non-volatile memory unit is executed for each of the pages. The access processing circuit is configured to execute the first access processing when receiving a writing or reading request to a first page on which the first access processing is set to be performed and execute the second access processing when receiving a writing or reading request to a second page on which the second access processing is set to be performed. And, the management circuit is configured to change an access method for a third page on which the second access processing is set to be performed to the first access processing from the second access processing when quality of the third page is equal to or lower than a reference value.

Hereinafter, an information processing apparatus 10 according to embodiments will be described in detail with reference to the drawings. Although a plurality of embodiments will be described below, the same reference numerals denote blocks having substantially the same functions and configurations and description of overlapped contents is omitted in a second and subsequent embodiments.

First Embodiment

FIG. 1 is a diagram illustrating an example of the hardware configuration of an information processing apparatus 10. The information processing apparatus 10 includes a processing circuit 12, a first memory unit 14, a non-volatile memory unit 16, and a memory controller 18.

The processing circuit 12 includes one or a plurality of processors. The processor is, for example, a central processing unit (CPU). The processor may include one or a plurality of CPU cores. The processing circuit 12 executes a computer program to process data. The processing circuit 12 reads data from the first memory unit 14 or the non-volatile memory unit 16 and writes data into the first memory unit 14 or the non-volatile memory unit 16 in accordance with execution of the computer program.

The processing circuit 12 has hierarchical cache memories such as an L1 data cache, an L1 instruction cache, an L2 cache, and an L3 cache. The processing circuit 12 temporarily stores data stored in the non-volatile memory unit 16 using the cache memories. When, for example, cache miss occurs in the lowermost cache (last-level cache) of the hierarchical caches, the processing circuit 12 accesses the first memory unit 14 or the non-volatile memory unit 16 by a cache line unit to read or write necessary data.

As the processing circuit 12, any circuit may be employed as long as it can execute data processing. The processing circuit 12 may be, for example, a graphics processing unit (GPU) that is used in a general-purpose computing on graphics processing unit (GPGPU). Alternatively, the processing circuit 12 may be an accelerator such as a field programmable gate array (FPGA).

The first memory unit 14 is a main storage unit that is used as a work region by the processing circuit 12. The first memory unit 14 is, for example, a volatile storage unit from which data stored therein is deleted when supply of electric power thereto is stopped. The first memory unit 14 is, for example, a dynamic random access memory (DRAM). The first memory unit 14 may be a non-volatile memory such as a magnetoresistive random access memory (MRAM) that is accessible at a high speed like the DRAM.

The non-volatile memory unit 16 is a memory that continuously stores therein data even when supply of electric power thereto is stopped. The non-volatile memory unit 16 may function as, for example, a main memory of the processing circuit 12 together with the first memory unit 14.

The non-volatile memory unit 16 includes, for example, a large-capacity high-speed non-volatile memory having a larger capacity than that of the DRAM. The non-volatile memory unit 16 is, for example, an MRAM, a phase change memory (PCM), a phase random access memory (PRAM), a phase change random access memory (PCRAM), a resistance change random access memory (ReRAM), a ferroelectric random access memory (FeRAM), a 3D XPoint, or a memristor. The non-volatile memory unit 16 may be a what-is-called storage class memory (SCM). The non-volatile memory unit 16 may be a module configured by providing a plurality of semiconductor devices on one substrate, housing, or the like.

The non-volatile memory unit 16 has a larger capacity than that of the first memory unit 14. The access speed of the non-volatile memory unit 16 is equal to or slightly lower than that of the first memory unit 14. Standby power of the non-volatile memory unit 16 is zero or extremely lower than that of the first memory unit 14. The non-volatile memory unit 16 is a memory having an access latency of 10 ns to several μs, as an example.

Data can be written and read into and from the non-volatile memory unit 16 by a small region unit such as a byte unit. Accordingly, the processing circuit 12 can directly access the non-volatile memory unit 16 with a load instruction or a storage instruction. The processing circuit 12 directly accesses the non-volatile memory unit 16 by, for example, a cache line unit. The non-volatile memory unit 16 may be implemented by continuously supplying electric power to a volatile memory the standby power of which is extremely low and that is accessible by the small region unit such as the byte unit.

The non-volatile memory unit 16 contains a plurality of pages. Each page is a data region as a data management unit by the processing circuit 12. Data can also be written and read into and from the non-volatile memory unit 16 by a page unit.

The memory controller 18 functions as a management device that manages reading and writing of data from and into the first memory unit 14 and the non-volatile memory unit 16 by the processing circuit 12. The memory controller 18 processes access requests to the first memory unit 14 and the non-volatile memory unit 16 from the processing circuit 12. That is to say, the memory controller 18 writes data into the first memory unit 14 or the non-volatile memory unit 16 in accordance with a writing instruction from the processing circuit 12. The memory controller 18 reads data from the first memory unit 14 or the non-volatile memory unit 16 and transfers the read data to the processing circuit 12 in accordance with a reading instruction from the processing circuit 12.

The memory controller 18 executes wear-leveling control on the non-volatile memory unit 16. To be more specific, the memory controller 18 manages the numbers of times of data rewriting for respective regions in the non-volatile memory unit 16. The memory controller 18 controls data writing positions such that pieces of data are averagely written into the entire region in the non-volatile memory unit 16 on the basis of the numbers of times of rewriting for the respective regions.

Figures 6, 7:
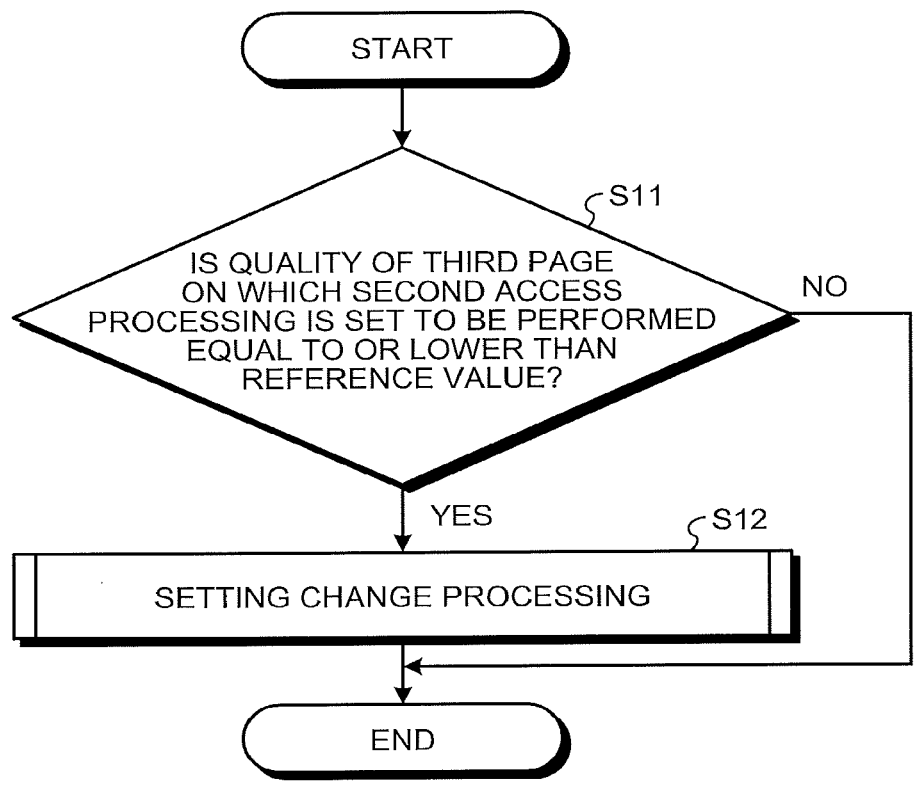
FIG. 6 is a diagram illustrating an example of a counter table.
FIG. 7 is a flowchart illustrating processing performed by a management unit in the first embodiment.

FIG. 2 is a diagram illustrating the configuration of the memory controller 18 in the first embodiment. FIG. 3 is a diagram illustrating an example of a conversion table in the first embodiment. FIG. 4 is a diagram illustrating an example of an unused table in the first embodiment. FIG. 5 is a diagram illustrating contents of first access processing and second access processing. FIG. 6 is a diagram illustrating an example of a counter table.

The memory controller 18 includes a setting storage unit 26, an access processor 28, a counter storage unit 36, an updating unit 40, and a management unit 50.

The setting storage unit 26 stores therein the conversion table and the unused table.

The conversion table stores therein a correspondence relation between a request address and a corresponding page number in the first memory unit 14 or the non-volatile memory unit 16 for each of the pages (active pages) to which the processing circuit 12 has requested access, as illustrated in FIG. 3, for example. That is to say, the conversion table stores therein mapping information indicating a page of the first memory unit 14 or the non-volatile memory unit 16 in which data corresponding to the request address by the processing circuit 12 is stored.

Furthermore, the conversion table stores therein an access method indicating whether the first access processing or the second access processing is executed for each of the pages indicated by the page numbers of the non-volatile memory unit 16 among the pages to which the processing circuit 12 has requested access.

The first access processing is a method in which data is written and read into and from data transferred to the first memory unit 14 from the non-volatile memory unit 16. The second access processing is a method in which data is directly written and read into and from data stored in the non-volatile memory unit 16.

As illustrated in FIG. 4, the unused table stores therein the access method indicating whether the first access processing or the second access processing is executed for each of the pages (inactive pages) to which the processing circuit 12 does not request access among the pages contained in the non-volatile memory unit 16.

Accordingly, the access method is set to each of all the pages contained in the non-volatile memory unit 16 in the conversion table or the unused table. It should be noted that the conversion table and the unused table are not limited to have the structures as illustrated in FIG. 3 and FIG. 4 and may have other structures.

The access processor 28 processes access requests to the first memory unit 14 and the non-volatile memory unit 16 from the processing circuit 12. That is to say, the memory controller 18 writes data into the first memory unit 14 or the non-volatile memory unit 16 in accordance with the writing instruction from the processing circuit 12. The memory controller 18 reads data from the first memory unit 14 or the non-volatile memory unit 16 and transfers the read data to the processing circuit 12 in accordance with the reading instruction from the processing circuit 12.

The access processor 28 executes the first access processing on the non-volatile memory unit 16 when receiving a writing or reading request to the first page on which the first access processing is set to be performed.

As illustrated in FIG. 5, the access processor 28, for example, transfers all of pieces of data stored in the first page in the non-volatile memory unit 16 to cause the first memory unit 14 to store therein the transferred data, in the first access processing. The first memory unit 14 can thereby store therein copies of the pieces of data stored in the first page in the non-volatile memory unit 16. Subsequently, the access processor 28 performs reading and writing of data from and into the pieces of data transferred from the non-volatile memory unit 16 that are stored in the first memory unit 14 in the first access processing. The access processor 28, for example, performs reading and writing of data from and into the pieces of data transferred to the first memory unit 14 from the non-volatile memory unit 16 by a size (for example, cache line size of the processor) that is smaller than the page. In the first access processing, when the first memory unit 14 no longer has vacant capacity and no data can be transferred to the first memory unit 14 from the non-volatile memory unit 16, when it is determined that the pieces of data need not to be stored in the first memory unit 14, and so on, the access processor 28 writes the pieces of data transferred to the first memory unit 14 back into the first page in the non-volatile memory unit 16.

It should be noted that the access processor 28 may also write the pieces of data transferred to the first memory unit 14 into a place other than the first page (same place). The access processor 28 may write the pieces of data transferred to the first memory unit 14 from the non-volatile memory unit 16 into, for example, an unused page to which no request address is correlated, on which the first access processing is set to be performed, and in which the number of times of rewriting is equal to or less than a predetermined value in the first access processing. The access processor 28 can thereby execute wear-leveling control for reducing difference in the number of times of rewriting among the pages to prevent deterioration in quality of a specific page.

The access processor 28 executes the second access processing on the non-volatile memory unit 16 when receiving a writing or reading request to the second page on which the second access processing is set to be performed.

As illustrated in FIG. 5, the access processor 28, for example, directly reads and writes data from and into the second page in the non-volatile memory unit 16 in the second access processing. The access processor 28, for example, reads and writes data by a size that is smaller than the page.

In this manner, the access processor 28 accesses the non-volatile memory unit 16 by the two types of access methods. When, for example, an application having high locality of memory access is executed, the access processor 28 accesses the page stored in the non-volatile memory unit 16 by the first access processing. The access processor 28 can therefore process the same page at a higher speed when executing the application having high locality of memory access.

When, for example, processing having low locality of memory access, such as random access, is executed, the access processor 28 accesses the page stored in the non-volatile memory unit 16 by the second access processing. The access processor 28 can therefore efficiently process the page while eliminating overhead in the transfer processing to the first memory unit 14 from the non-volatile memory unit 16 when executing the processing having low locality. As described above, the access processor 28 can improve efficiency of the processing performed by using the two types of access methods of the first access processing and the second access processing.

The counter storage unit 36 stores therein a counter table. The counter table stores therein a counter value indicating the number of times of rewriting data for each of the pages contained in the non-volatile memory unit 16.

As illustrated in FIG. 6, the counter table stores the counter values so as to correspond to the numbers of pages contained in the non-volatile memory unit 16, for example. The counter value indicates the number of times that the corresponding page is rewritten. The counter value is set to, for example, 0 at the initial time such as the factory shipment, and is incremented by one every rewriting. It should be noted that the counter table is not limited to have the structure as illustrated in FIG. 6 and may have other structures.

The updating unit 40 updates the counter values stored in the counter table. When the access processor 28 writes data into the non-volatile memory unit 16, the updating unit 40 acquires address information of the written data and updates the counter value on the basis of the acquired address information.

The management unit 50 executes the wear-leveling control on the non-volatile memory unit 16 on the basis of the counter values for the respective pages stored in the counter storage unit 36. The management unit 50 controls pages into which pieces of data are written such that the pieces of data are averagely written into the entire region in the non-volatile memory unit 16.

The management unit 50 determines whether quality of the third page on which the second access processing is set to be performed is equal to or lower than a reference value. The management unit 50 may determine that the quality of the third page on which the second access processing is set to be performed is equal to or lower than the reference value when, for example, the number of times of writing in the third page is equal to or more than a predetermined value. The management unit 50 may determine that the quality of the third page on which the second access processing is set to be performed is equal to or lower than the reference value when the number of erroneous bits in the pieces of data read from the third page is equal to or more than a predetermined value. Furthermore, the management unit 50 may determine that the quality thereof is equal to or lower than the reference value by another method using neither of the number of times of writing nor the number of erroneous bits. The quality lowers due to deterioration, abrasion, or the like. What the quality is equal to or lower than the reference value, for example, indicates that (the degree of) deterioration or (the degree of) abrasion is equal to or higher than a reference value in other words. The management unit 50 can determine the deterioration in the quality by detecting the number of erroneous bits or detecting the number of times of rewriting.

The management unit 50 changes the access method for the third page on which the second access processing is set to be performed to the first access processing from the second access processing when the quality of the third page is equal to or lower than the reference value.

Furthermore, when the quality of the third page is equal to or lower than the reference value, the management unit 50 selects, as the fourth page, a page on which the second access processing is set to be performed, that is unused, and in which the number of times of rewriting satisfies a predetermined reference. The management unit 50, for example, selects the fourth page with reference to the counter table and the unused table. The page in which the number of times of rewriting satisfies the predetermined reference may be, for example, a page in which the number of times of rewriting is minimum or is equal to or less than a predetermined number of times.

The management unit 50 moves the pieces of data stored in the third page to the fourth page on which the second access processing is set to be performed when the quality of the third page is equal to or lower than the reference value. The management unit 50 deletes the fourth page from the unused table stored in the setting storage unit 26 and registers the fourth page in the conversion table. Then, the management unit 50 correlates, to the fourth page registered in the conversion table, the request address that has been correlated to the third page.

Furthermore, the management unit 50 changes the third page to an unused page to which no request address is correlated. The management unit 50, for example, deletes the third page from the conversion table and registers the third page in the unused table.

FIG. 7 is a flowchart illustrating processing performed by the management unit 50 in the first embodiment. The management unit 50 executes, for example, the processing illustrated in FIG. 7.

First, the management unit 50 determines whether the quality of the third page on which the second access processing is set to be performed is equal to or lower than the reference value at S11. The determination may be made at any timing.

The management unit 50, for example, may determine whether the number of times of writing in the third page on which the second access processing is set to be performed is equal to or more than the predetermined value at the timing when the number of times of writing has been updated. The management unit 50 may determine whether the number of erroneous bits of read data is equal to or more than the predetermined value at the timing when the data has been read from the third page.

When the quality of the third page is not equal to or lower than the reference value (No at S11), the management unit 50 finishes this flow. When the quality of the third page is equal to or lower than the reference value (Yes at S11), the management unit 50 proceeds with the process to S12.

The management unit 50 executes setting change processing at S12. The setting change processing is described with reference to FIG. 8. The management unit 50 finishes this flow when completing the setting change processing.

Figure 8:
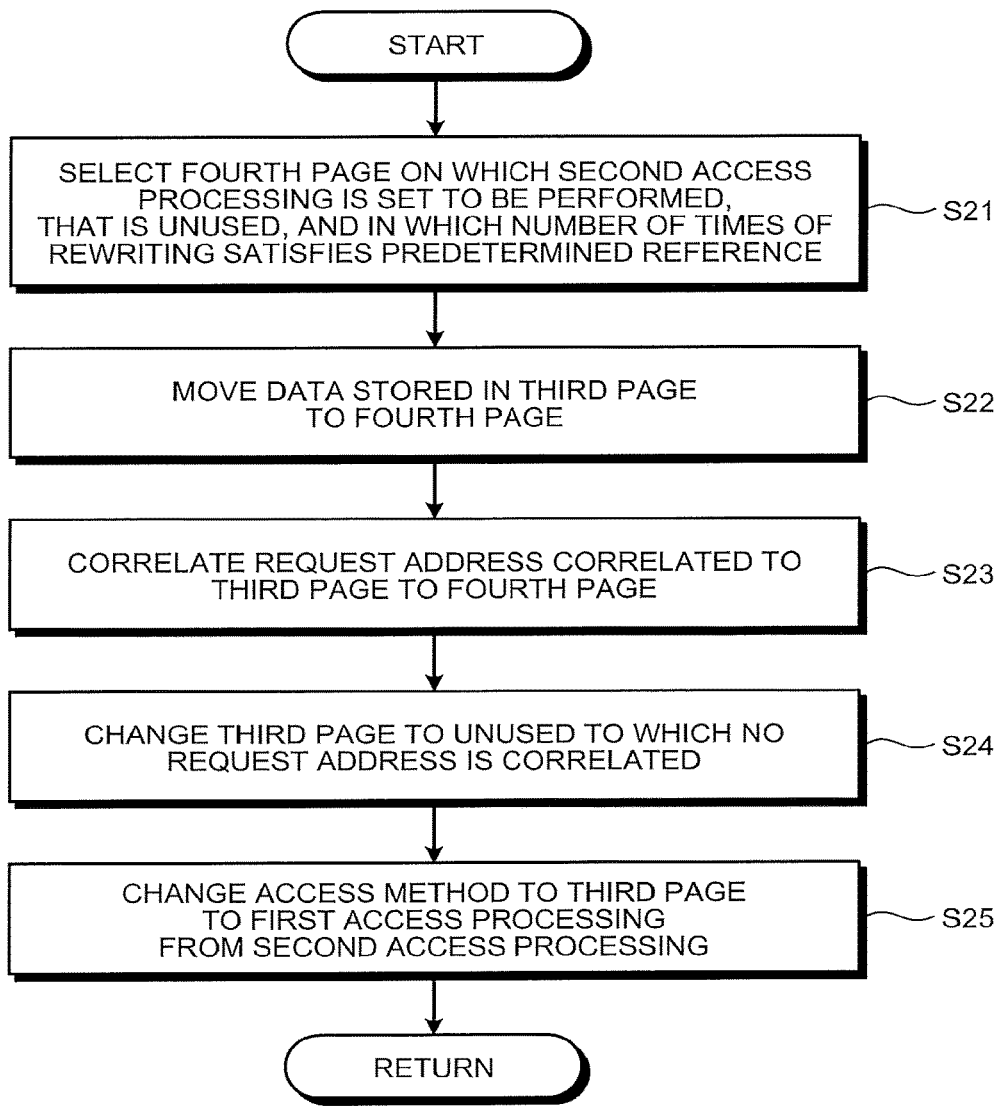
FIG. 8 is a flowchart illustrating setting change processing in the first embodiment.
Figure 9:
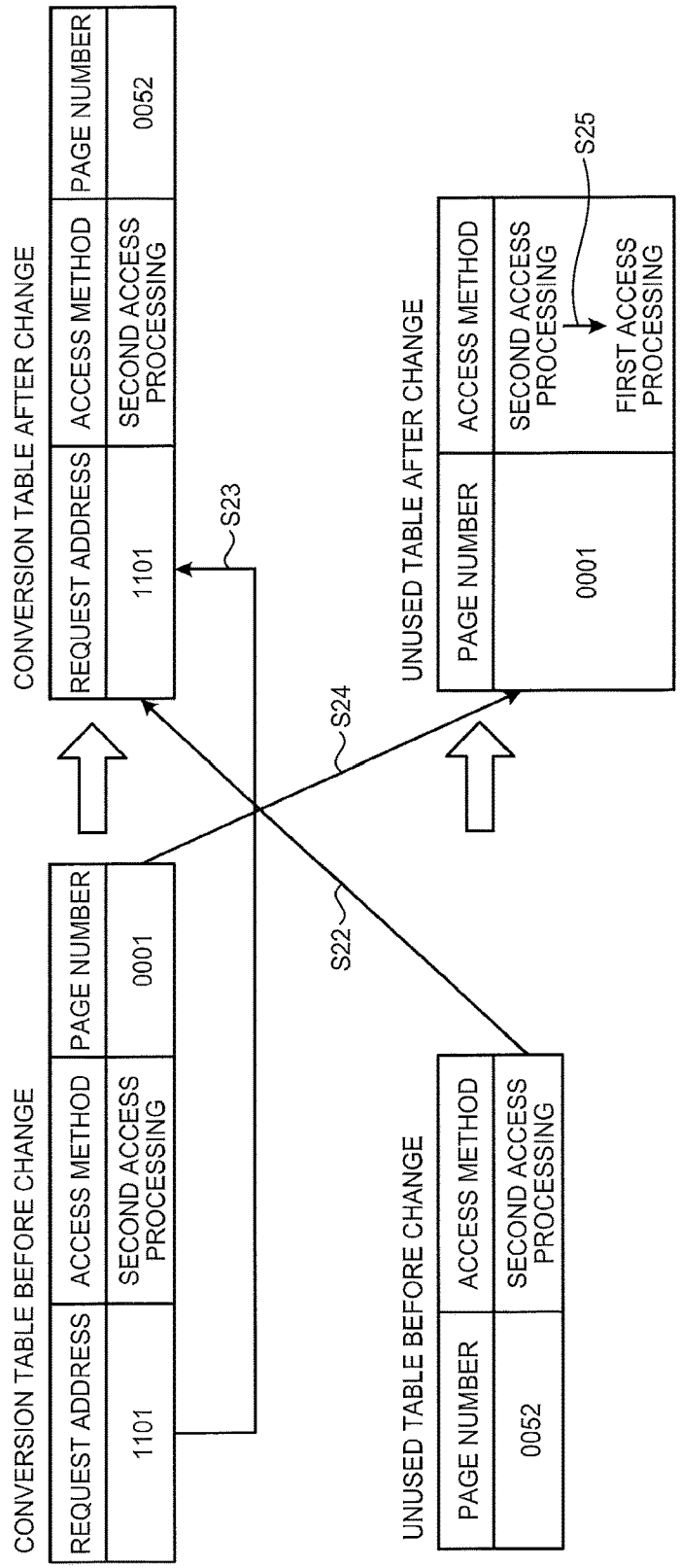
FIG. 9 is a diagram illustrating change examples of the tables in the first embodiment.

FIG. 8 is a flowchart illustrating the setting change processing in the first embodiment. FIG. 9 is a diagram illustrating change examples of the conversion table and the unused table in the first embodiment.

The management unit 50 executes pieces of processing at S21 to S25 illustrated in FIG. 8 in the setting change processing at S12 in FIG. 7.

First, the management unit 50 selects the fourth page at S21. To be specific, the management unit 50 detects one or more unused pages that are unused pages and on which the second access processing is set to be performed as the access method with reference to the unused table stored in the setting storage unit 26. The management unit 50 selects a page in which the number of times of rewriting satisfies the predetermined reference among the detected one or more pages with reference to the counter table stored in the counter storage unit 36. The page in which the number of times of rewriting satisfies the predetermined reference may be the page in which the number of times of rewriting is minimum or is equal to or less than the predetermined number of times.

Subsequently, the management unit 50 accesses the nonvolatile memory unit 16 and moves the pieces of data stored in the third page to the fourth page on which the second access processing is set to be performed at S22. The management unit 50, for example, reads the pieces of data stored in the third page and writes them into the fourth page. As illustrated in FIG. 9, the management unit 50 deletes the entry of the fourth page (page number "0052") in the unused table and newly adds the entry of the fourth page to the conversion table.

Then, the management unit 50 correlates, to the fourth page, the request address that has been correlated to the third page at S23. As illustrated in FIG. 9, the management unit 50 stores, in the entry of the fourth page added to the conversion table, the request address ("1101") that has been stored in the entry of the third page.

The management unit 50 changes the third page to an unused page to which no request address is correlated at S24. As illustrated in FIG. 9, the management unit 50, for example, deletes the entry of the third page (page number "0001") in the conversion table and newly adds the entry of the third page to the unused table.

Thereafter, the management unit 50 changes the access method for the third page to the first access processing from the second access processing at S25. As illustrated in FIG. 9, the management unit 50, for example, changes the access method in the entry of the third page in the unused table to the first access processing from the second access processing.

The management unit 50 then returns the process to the flow in FIG. 7 when completing the processing at S25.

Figure 10:
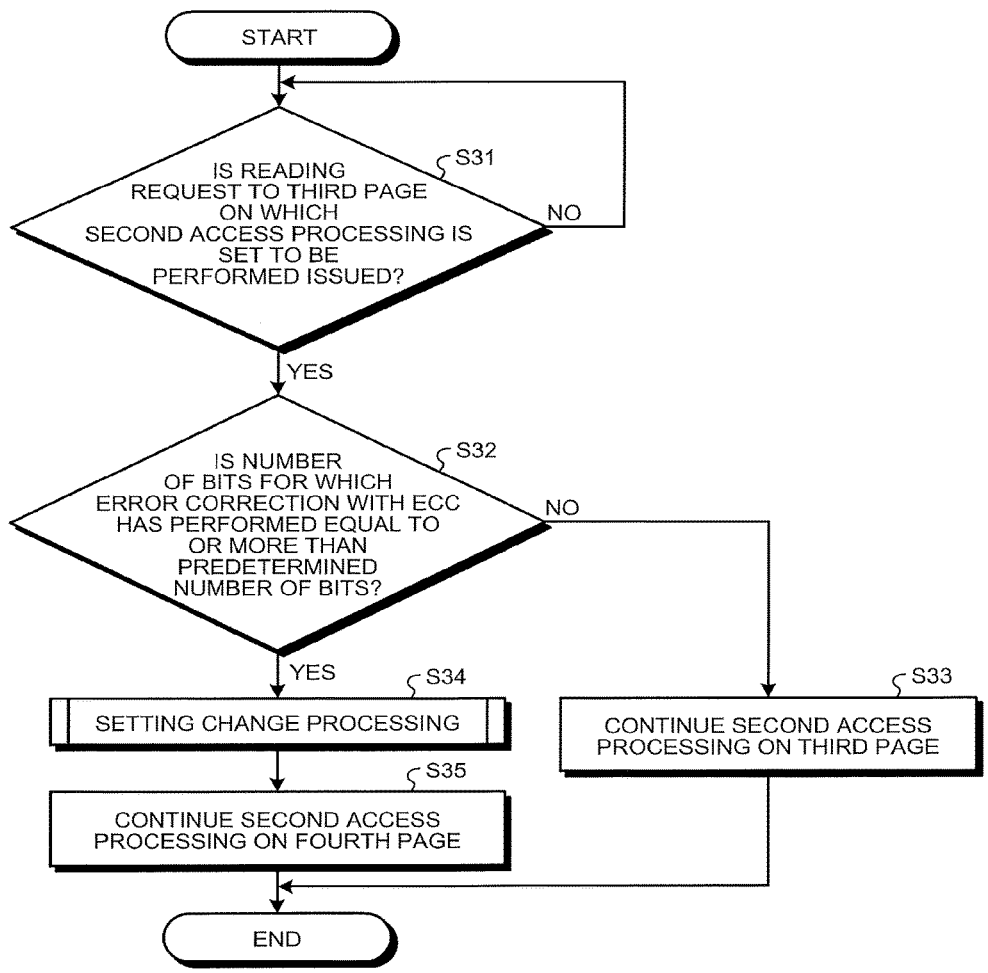
FIG. 10 is a flowchart for determining quality on the basis of the number of error-corrected bits.

FIG. 10 is a flowchart illustrating processing performed by the management unit 50 when the quality is determined on the basis of the number of error-corrected bits. The management unit 50 may determine whether the quality of the page on which the second access processing is set to be performed is equal to or lower than the reference value on the basis of the number of error-corrected bits. In this case, the management unit 50 executes pieces of processing at S31 to S35 illustrated in FIG. 10.

First, the management unit 50 determines whether a reading request to the third page on which the second access processing is set to be performed is issued at S31. When the above-mentioned reading request is not issued (No at S31), the management unit 50 stands by at the process at S31. When the above-mentioned reading request is issued (Yes at S31), the management unit 50 proceeds with the process to S32.

Subsequently, the management unit 50 determines whether the number of bits for which the error correction with an error check and correct memory (ECC) has performed on the pieces of data read from the third page is equal to or more than a predetermined number of bits at S32.

When the ECC can correct errors for three bits, the management unit 50 determines whether, for example, errors of two bits (or one bit) have occurred. When the ECC can correct errors for two bits, the management unit 50 determines whether, for example, an error of one bit has occurred. That is to say, the management unit 50 determines whether errors for the number of bits that are less than the maximum number of bits for which the ECC can correct the errors have occurred. The management unit 50 can thereby change the access method for the third page to the first access processing from the second access processing before the number of times of rewriting reaches a limit value.

When the number of bits for which the error correction with the ECC has performed is not equal to or more than the predetermined number of bits (No at S32), the management unit 50 proceeds with the process to S33. The management unit 50 causes the access processor 28 to continue the second access processing on the third page at S33.

When the number of bits for which the error correction with the ECC has performed is equal to or more than the predetermined number of bits (Yes at S32), the management unit 50 proceeds with the process to S34. The management unit 50 executes the setting change processing illustrated at S21 to S25 in FIG. 8 at S34. The management unit 50 proceeds with the process to S35 when completing the processing at S34. The management unit 50 causes the access processor 28 to continue the second access processing on the fourth page at S35.

The management unit 50 finishes this flow when completing the processing at S33 or S35.

Advantageous Effects

When the first access processing is executed, the management unit 50 can manage the number of times of rewriting into the non-volatile memory unit 16 by the page unit. Accordingly, the management unit 50 can easily average the number of times of rewriting by writing the pieces of data back into the non-volatile memory unit 16 such that rewriting is not concentrated on a specific page, for example. When the first access processing is executed, the management unit 50 can reduce the number of times of rewriting into the non-volatile memory unit 16 because the pieces of data transferred to the first memory unit 14 are accessed in accordance with the access request from the processing circuit 12.

On the other hand, when the second access processing is executed, the non-volatile memory unit 16 is rewritten in accordance with all of the access requests from the processing circuit 12. In this case, in the management unit 50, rewriting into a specific byte is concentrated to possibly increase the number of times of rewriting into the non-volatile memory unit 16. Accordingly, when the second access processing is executed a large number of times, the non-volatile memory unit 16 reaches a limit value of the number of times of rewriting for a short period of time highly possibly.

The management unit 50, however, changes the access method for the third page to the first access processing from the second access processing when the quality of the third page is equal to or lower than the reference value. The management unit 50 can thereby switch the access method for the third page in which the number of times of rewriting is close to the limit value, to the access method decreasing the number of times of rewriting. Accordingly, the management unit 50 can further average the number of times of rewriting to extend the lifetime of the non-volatile memory unit 16.

Furthermore, the management unit 50 moves the pieces of data stored in the third page to the fourth page on which the second access processing is set to be performed when the quality of the third page is equal to or lower than the reference value, and memory access issued from the processing circuit 12 can be continued by the same access method. Moreover, the management unit 50 selects a page with a relatively small number of times of rewriting as the four page, thereby further averaging the number of times of rewriting to extend the lifetime of the non-volatile memory unit 16.

As described above, the information processing apparatus 10 in the first embodiment can efficiently access the non-volatile memory unit 16 to extend the lifetime of the non-volatile memory unit 16.

Second Embodiment

Figure 11:
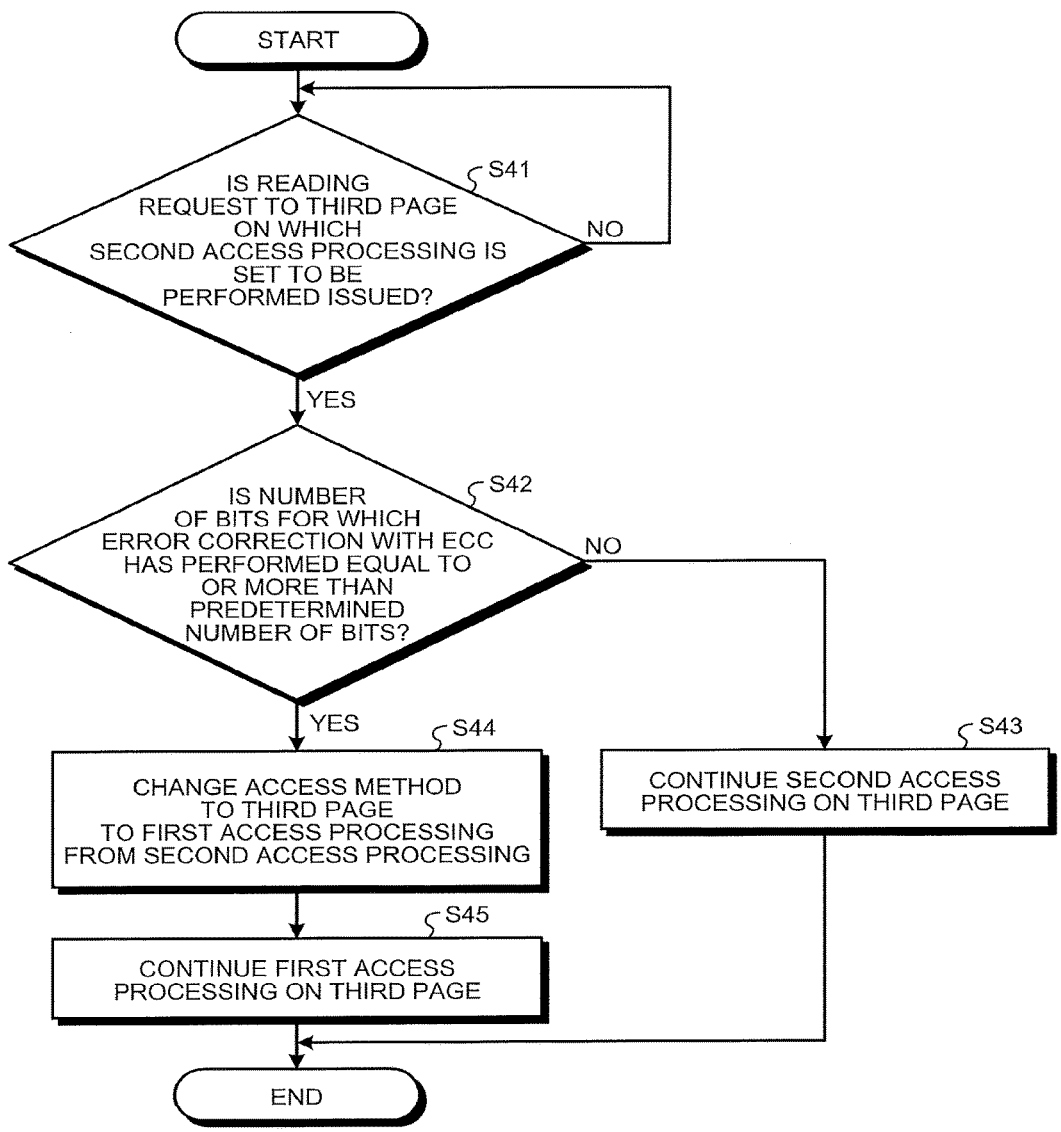
FIG. 11 is a flowchart illustrating processing performed by a management unit according to a second embodiment.

FIG. 11 is a flowchart illustrating processing performed by the management unit 50 in a second embodiment. The management unit 50 executes, for example, pieces of processing at S41 to S45 illustrated in FIG. 11 in the second embodiment.

First, the management unit 50 determines whether a reading request to the third page on which the second access processing is set to be performed is issued at S41. When the reading request is not issued (No at S41), the management unit 50 stands by at the process at S41. When the reading request is issued (Yes at S41), the management unit 50 proceeds with the process to S42.

Subsequently, the management unit 50 determines whether the number of bits for which the error correction with the ECC has performed on the pieces of data read from the third page is equal to or more than the predetermined number of bits at S42. When the number of bits for which the error correction with the ECC has performed is not equal to or more than the predetermined number of bits (No at S42), the management unit 50 proceeds with the process to S43. The management unit 50 causes the access processor 28 to continue the second access processing on the third page at S43.

When the number of bits for which the error correction with the ECC has performed is equal to or more than the predetermined number of bits (Yes at S42), the management unit 50 proceeds with the process to S44. The management unit 50 changes the access method for the third page to the first access processing from the second access processing at S44. The management unit 50 proceeds with the process to S45 when completing the processing at S44. The management unit 50 causes the access processor 28 to continue the first access processing on the third page at S45.

The management unit 50 finishes this flow when completing the processing at S43 or S45.

As described above, the management unit 50 changes the access method for the third page to the first access processing from the second access processing when the quality of the third page on which the second access processing is set to be performed is equal to or lower than the reference value in the second embodiment. The management unit 50 does not, however, move the pieces of data stored in the third page to the fourth page on which the second access processing is set to be performed.

Accordingly, the management unit 50 cannot continue the memory access issued from the processing circuit 12 by the same access method. The management unit 50 changes the access method for the third page to the first access processing from the second access processing and can thereby at least switch the access method for the third page in which the number of times of rewriting is close to the limit value, to the access method decreasing the number of times of rewriting thereafter.

As described above, the information processing apparatus 10 in the second embodiment can average the number of times of rewriting in the non-volatile memory unit 16 to extend the lifetime of the non-volatile memory unit 16.

Third Embodiment

Figure 12:
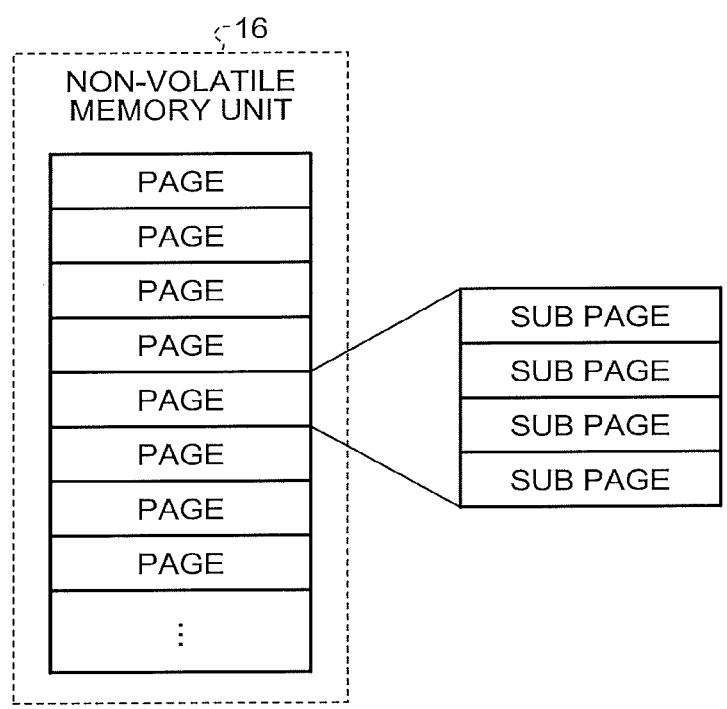
FIG. 12 is a diagram illustrating a non-volatile memory unit according to a third embodiment.

FIG. 12 is a diagram illustrating the non-volatile memory unit 16 according to a third embodiment. The non-volatile memory unit 16 contains a plurality of pages. In the third embodiment, each of the plurality of pages contains a plurality of sub pages.

Each sub page may be a data management unit by the processing circuit 12. The processing circuit 12 can write and read data by the sub page unit. The sub page in the embodiment may be referred to as another terminology.

Figure 13:
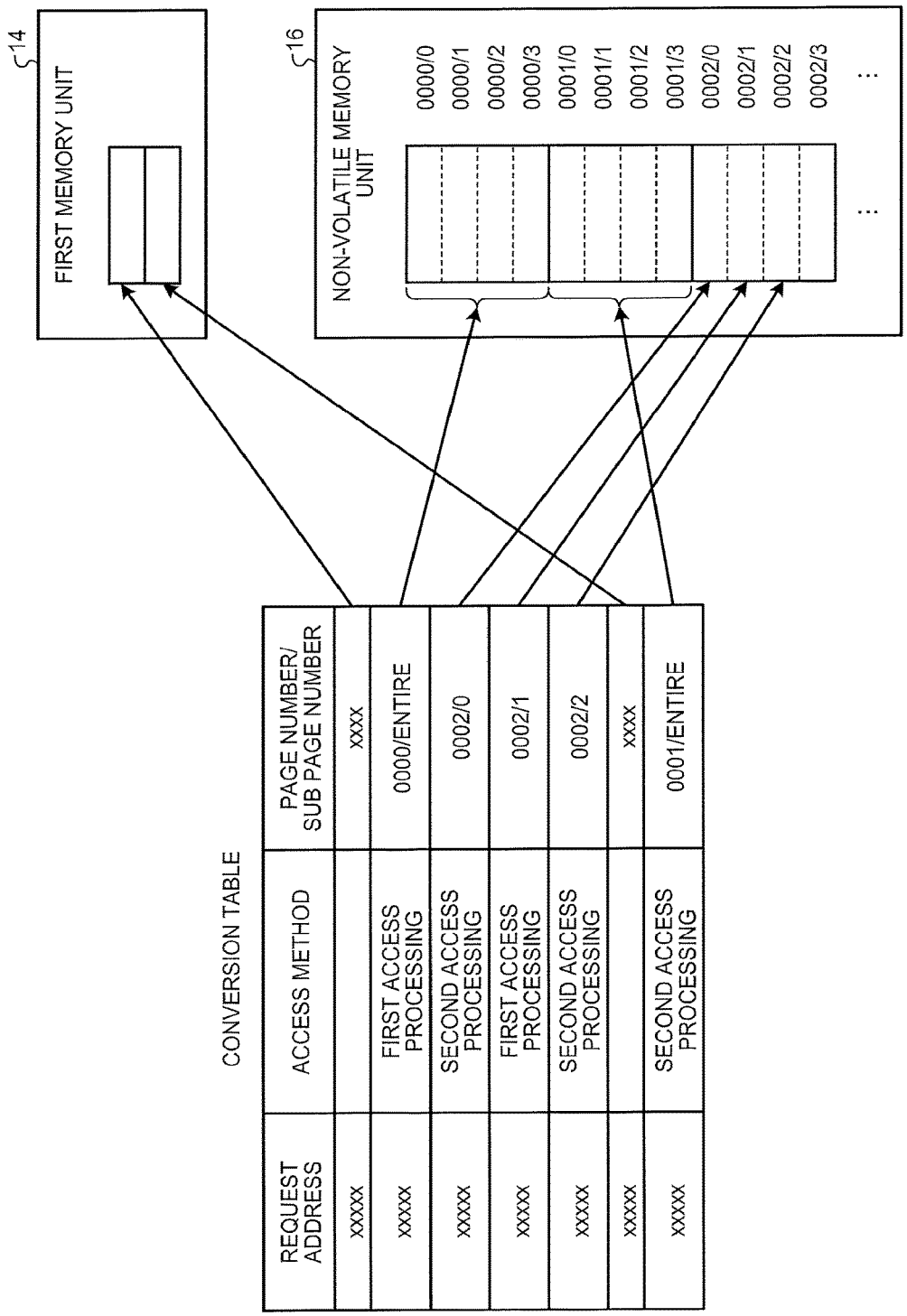
FIG. 13 is a diagram illustrating an example of a conversion table in the third embodiment.

FIG. 13 is a diagram illustrating an example of a conversion table in the third embodiment. The conversion table in the third embodiment stores therein, for each of the pages, either of the access method for the entire page or the access method for each of the sub pages contained in the page, as illustrated in FIG. 13. The conversion table, for example, stores therein request address corresponding to each page for which the access method for the entire page is set. The conversion table stores therein a request address corresponding to each sub page when the access method for the sub page is set.

Accordingly, in the third embodiment, the management unit 50 can set whether the first access processing or the second access processing is executed for the entire page. Furthermore, the management unit 50 can set whether the first access processing or the second access processing is executed for each of the sub pages contained in the page for which the access method for the entire page is not set. It should be noted that the conversion table is not limited to have the structure as illustrated in FIG. 13 and may have other structures.

FIG. 14 is a diagram illustrating an example of an unused table in the third embodiment. As illustrated in FIG. 14, the unused table in the third embodiment stores therein an access method for each of the pages or each of the sub pages to which the processing circuit 12 does not request access among the pages contained in the non-volatile memory unit 16.

The unused table, for example, stores therein the access method for the entire page when the entire page is unused and the access methods to all of the sub pages contained in the page are the same. The unused table does not store therein the access method for the entire page but stores therein the access method for each of the sub pages for the page in which a part of the sub pages is unused or the access method is different among the sub pages. It should be noted that the unused table is not limited to have the structure as illustrated in FIG. 14 and may have other structures.

Figure 15:
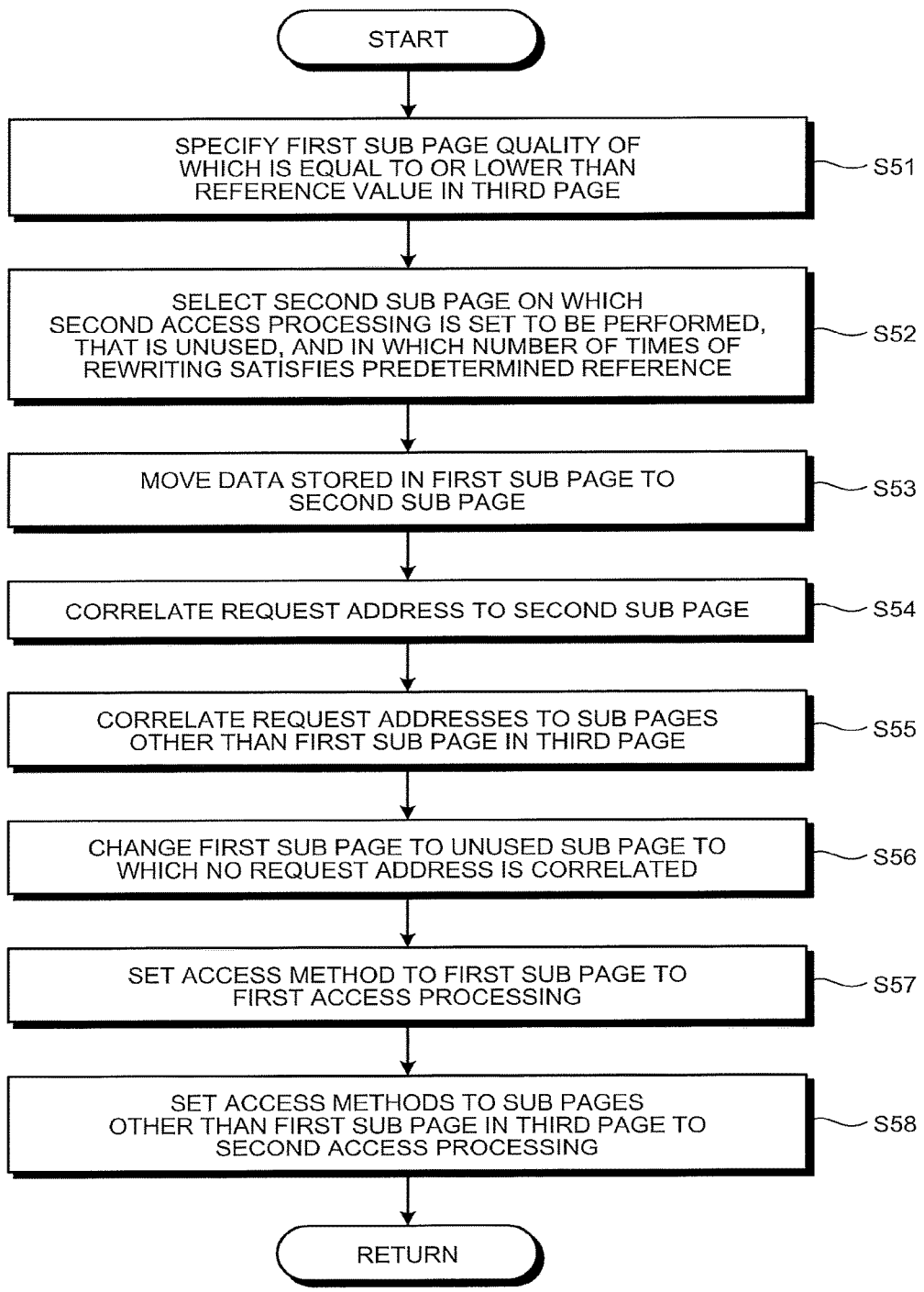
FIG. 15 is a flowchart illustrating setting change processing in the third embodiment.
Figure 16:
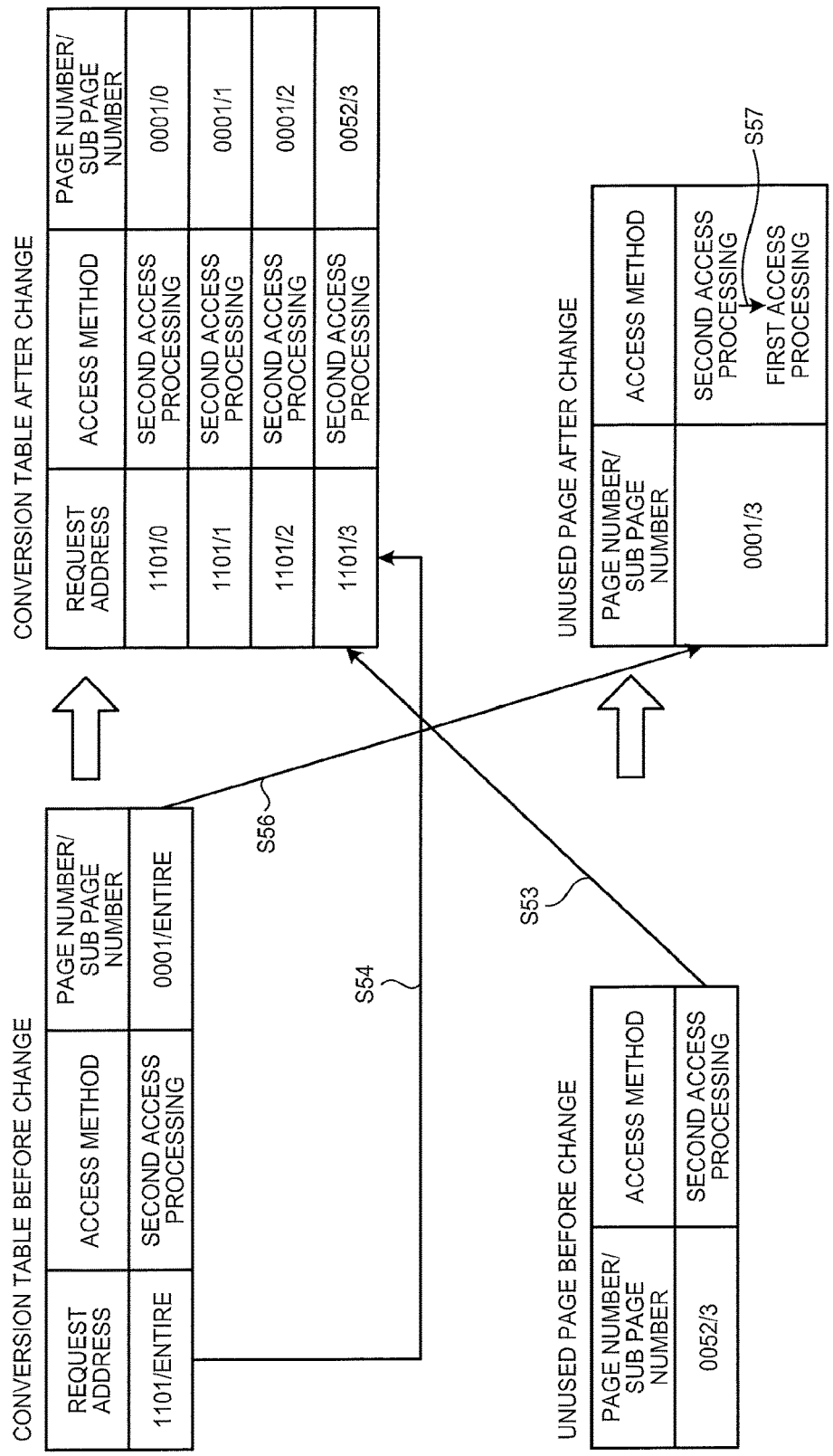
FIG. 16 is a diagram illustrating change examples of the tables in the third embodiment.

FIG. 15 is a flowchart illustrating setting change processing in the third embodiment. FIG. 16 is a diagram illustrating change examples of the conversion table and the unused table in the third embodiment.

The management unit 50 in the third embodiment executes pieces of processing at S51 to S58 illustrated in FIG. 15 in the setting change processing at S12 in FIG. 7.

First, the management unit 50 specifies the first sub page quality of which is equal to or lower than a reference value among sub pages contained in the third page at S51. The management unit 50 specifies, as the first sub page, for example, a sub page having the number of bits for which the error correction with the ECC has performed that is equal to or more than a predetermined value.

Subsequently, the management unit 50 selects a second sub page at S52. The management unit 50 selects, as the second sub page, for example, a sub page on which the second access processing is set to be performed, that is unused, and in which the number of times of rewriting satisfies a predetermined reference. The sub page in which the number of times of rewriting satisfies the predetermined reference may be a sub page in which the number of times of rewriting is minimum or is equal to or less than the predetermined number of times.

Then, the management unit 50 moves pieces of data stored in the first sub page to the second sub page on which the second access processing is set to be performed at S53. The management unit 50, for example, reads the pieces of data stored in the first sub page and writes them into the second sub page. As illustrated in FIG. 16, the management unit 50 deletes the entry of the second sub page (page number and sub page number "0052/3") in the unused table and newly adds the entry of the second sub page to the conversion table. The management unit 50 further newly adds the entries of sub pages (page numbers and sub page numbers "0001/0", "0001/1", and "0001/2") other than the first sub page in the third page to the conversion table.

The management unit 50 correlates, to the second sub page, the request address that has been correlated to the first sub page at S54. As illustrated in FIG. 16, the management unit 50, for example, stores the request address ("1101/3") correlated to the first sub page in the entry of the second sub page added to the conversion table.

Subsequently, the management unit 50 correlates the request addresses to the sub pages other than the first sub page in the third page at S55. As illustrated in FIG. 16, the management unit 50, for example, stores the request addresses ("1101/0", "1101/1", and "1101/2") in the entries of the sub pages other than the first sub page in the third page that have been added to the conversion table.

The management unit 50 changes the first sub page to an unused sub page to which no request address is correlated at S56. As illustrated in FIG. 16, the management unit 50, for example, deletes the entry of the third page (page number and sub page number "0001/entire") in the conversion table and newly adds the entry of the first sub page (page number and sub page number "0001/3") to the unused table.

Thereafter, the management unit 50 changes the access method for the first sub page to the first access processing from the second access processing at S57. As illustrated in FIG. 16, the management unit 50, for example, changes the access method in the entry of the first sub page in the unused table to the first access processing from the second access processing.

The management unit 50 sets the access method for the sub pages other than the first sub page in the third page to the second access processing at S58. As illustrated in FIG. 16, the management unit 50, for example, sets the access methods in the entries of the sub pages (page numbers and sub page numbers "0001/0", "0001/1", and "0001/2") other than the first sub page in the conversion table to the second access processing.

The management unit 50 returns the process to the flow in FIG. 7 when completing the processing at S58.

When the capacity of the non-volatile memory unit 16 is increased, the size of the conversion table is also increased and address conversion efficiency is deteriorated. In order to decrease the conversion table in size, the page size needs to be increased. The increase in the page size, however, increases the possibility that many regions with a small number of times of rewriting are contained when the second access processing is switched to the first access processing. In the third embodiment, the management unit 50 switches the second access processing to the first access processing by the size of the sub page that is smaller than that of the page and access to the regions with the small number of times of rewriting is made by the second access processing. The management unit 50 in the third embodiment thereby switches the access method for minimum necessary regions to the second access processing, thereby extending the lifetime of the non-volatile memory unit 16 efficiently.

Fourth Embodiment

Figure 17:
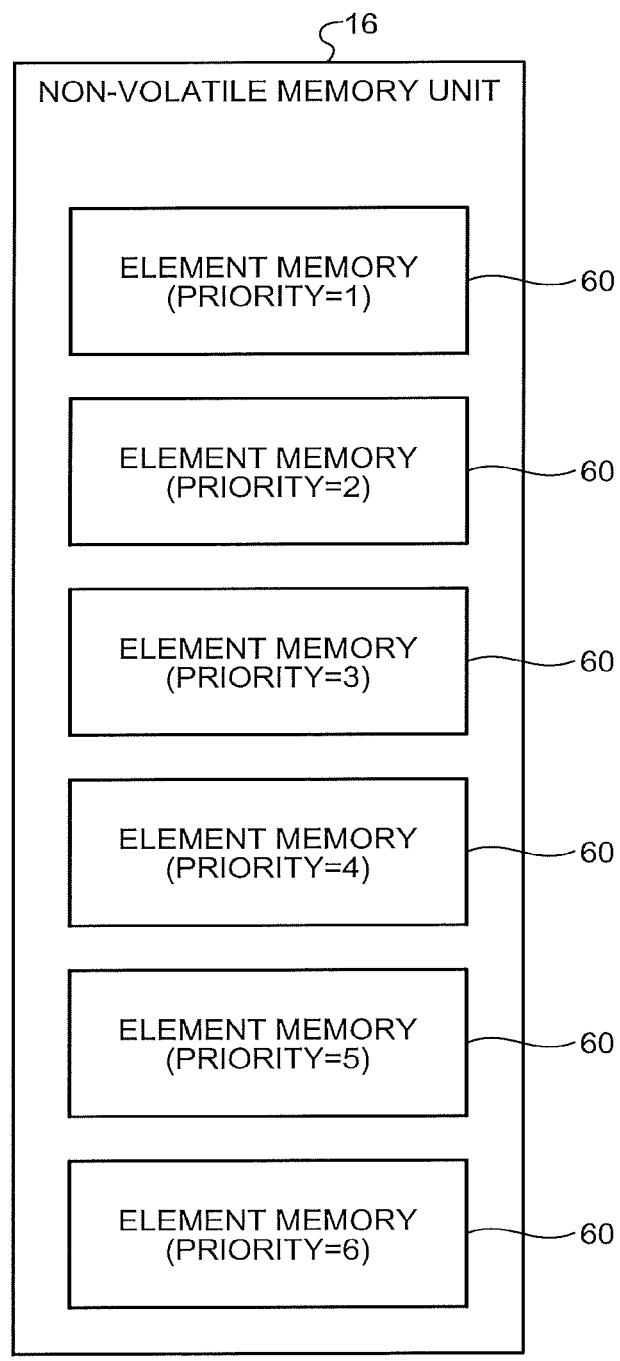
FIG. 17 is a diagram illustrating the configuration of a non-volatile memory unit according to a fourth embodiment.

FIG. 17 is a diagram illustrating the configuration of the non-volatile memory unit 16 according to a fourth embodiment. The non-volatile memory unit 16 in the fourth embodiment includes a plurality of element memories 60 that can be individually replaced and to which priorities are set.

Each element memory 60 is a physically united memory and may be one semiconductor memory or a memory substrate such as a dual inline memory module (DIMM) inserted into one slot. It is sufficient that the management unit 50 can identify the priorities set to the respective element memories 60 and the respective element memories 60 may not store therein the priorities.

Figure 18:
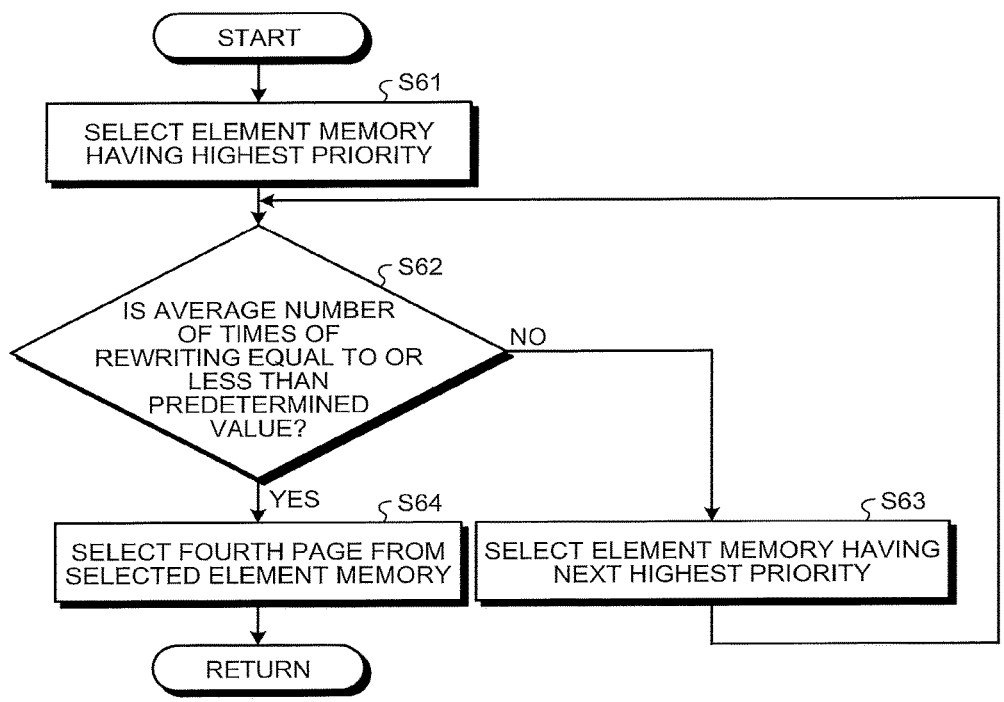
FIG. 18 is a flowchart illustrating selection processing of the fourth page in the fourth embodiment.

FIG. 18 is a flowchart illustrating selection processing of the fourth page in the fourth embodiment. When the fourth page is selected, the management unit 50 selects, from the element memories 60, the element memory 60 in which the number of times of rewriting satisfies predetermined conditions and that has the highest priority, and selects the fourth page from the selected element memory 60.

The management unit 50, for example, executes pieces of processing at S61 to S64 illustrated in FIG. 18 when selecting the fourth page.

First, the management unit 50 selects the element memory 60 having the highest priority at S61. Subsequently, the management unit 50 determines whether the average number of times of rewriting in the selected element memory 60 is equal to or lower than a predetermined value at S62. It should be noted that the management unit 50 may determine whether the total number of times of rewriting is equal to or less than a predetermined value. For example, an operating system executed in the processing circuit 12 may monitor the numbers of times of rewriting in the respective element memories 60 and select the element memory 60 satisfying the conditions. In this case, the management unit 50 acquires information indicating whether the element memory 60 satisfies the conditions (for example, the average number of times of rewriting is equal to or less than the predetermined value), from the processing circuit 12.

When the average number of times of rewriting is not equal to or lower than the predetermined value (No at S62), the management unit 50 proceeds with the process to S63. The management unit 50 selects the element memory 60 having the next highest priority at S63 and proceeds with the process to S62. In this case, the management unit 50 executes the same processing on the selected element memory 60 at S62 and repeats the pieces of processing at S62 and S63 until the element memory 60 in which the average number of times of rewriting is equal to or lower than the predetermined value is selected.

When the average number of times of rewriting is equal to or less than the predetermined value (Yes at S62), the management unit 50 proceeds with the process to S64. The management unit 50 selects the fourth page from the selected element memory 60 at S64. In this case, the management unit 50 selects the fourth page such that the number of times of rewriting in the element memory 60 is averaged.

The management unit 50 can select the fourth page with the above-mentioned pieces of processing. It should be noted that the management unit 50 may execute the same pieces of processing when selecting the second sub page in the third embodiment.

The information processing apparatus 10 in the fourth embodiment selects the fourth page in this manner to thereby use the element memories 60 in the order from that having the higher priority. When, for example, the element memory 60 needs to be replaced, the information processing apparatus 10 can replace a part of the element memories 60 without replacing all of the element memories 60 at a time. The information processing apparatus 10 may switch the element memory 60 having the average number of times of usage that is larger than the predetermined number of times to a memory for storage that is connected through a device interface or the like, for example.

Fifth Embodiment

Figure 19:
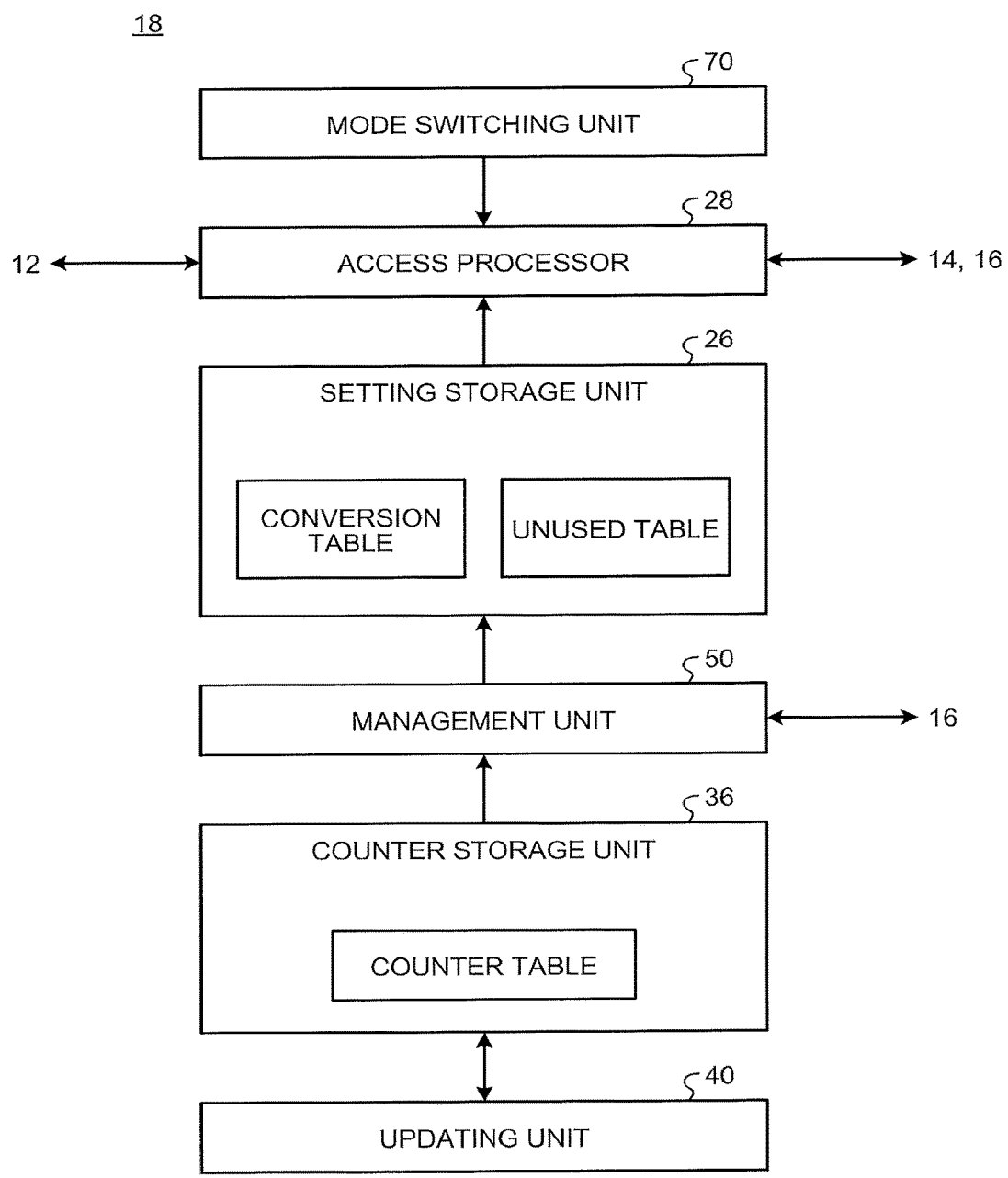
FIG. 19 is a diagram illustrating the configuration of a memory controller according to a fifth embodiment.

FIG. 19 is a diagram illustrating the configuration of the memory controller 18 according to a fifth embodiment. The memory controller 18 in the fifth embodiment further includes a mode switching unit 70.

The mode switching unit 70 sets a first mode before the information processing apparatus 10 reaches a predetermined state and switches the first mode to a second mode after the information processing apparatus 10 reaches the predetermined state. The mode switching unit 70 notifies the access processor 28 of the current mode. The mode switching unit 70, for example, sets the first mode in a period from the start of usage of the information processing apparatus 10 to a predetermined timing (first period). The mode switching unit 70 sets the second mode in a period after the predetermined timing elapses from the start of usage of the information processing apparatus 10 (second period).

Figure 20:
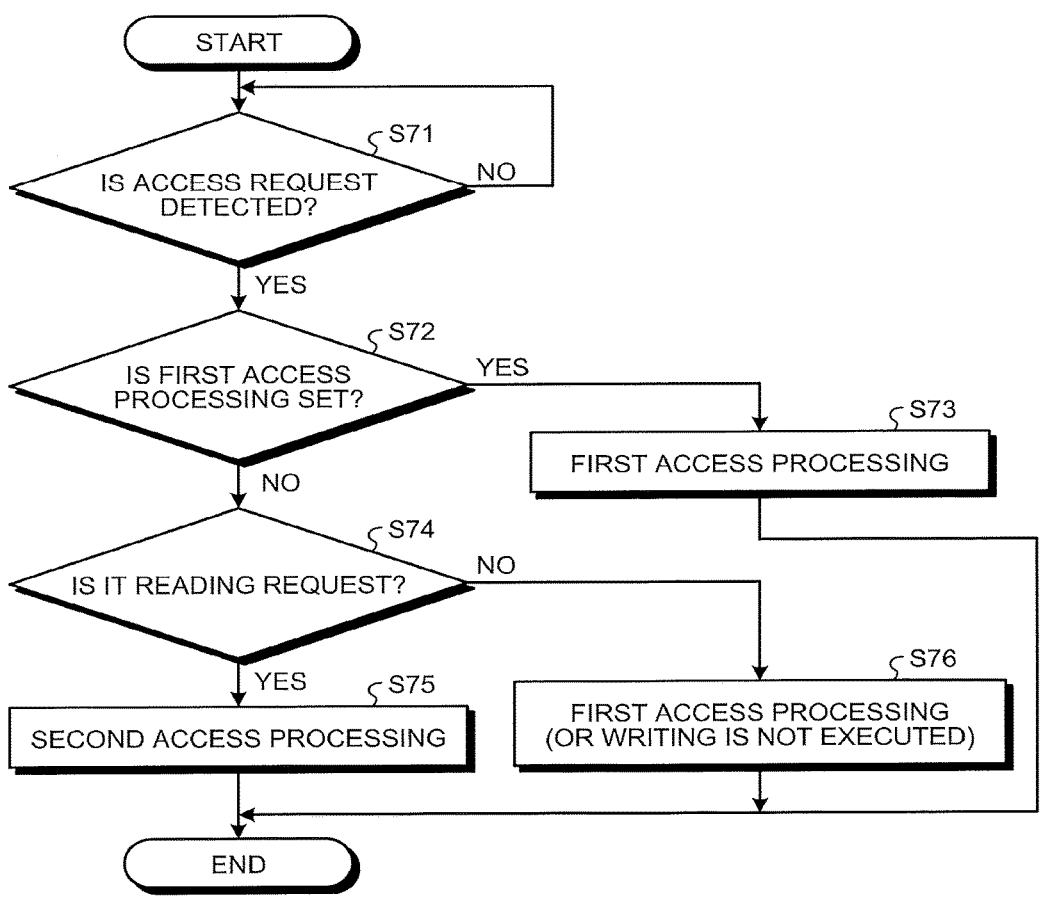
FIG. 20 is a flowchart illustrating flow of processing performed by an access processor in a second mode.

FIG. 20 is a flowchart illustrating flow of processing performed by the access processor 28 in the second mode. In the second mode, that is, in the second period after the information processing apparatus 10 reaches the predetermined state, the access processor 28, for example, executes pieces of processing at S71 to S76 illustrated in FIG. 20.

First, at S71, the access processor 28 determines whether an access request (reading or writing request) to the non-volatile memory unit 16 has been detected. When the access request has not been detected (No at S71), the access processor 28 stands by at the process at S71. When the access request has been detected (Yes at S71), the access processor 28 proceeds with the process to S72.

The access processor unit 28 determines whether the first access processing is set to be performed on a page as an access destination at S72. When the first access processing is set to be performed on the page (Yes at S72), the access processor 28 proceeds with the process to S73. The access processor 28 executes the first access processing at S73. That is to say, the access processor 28 executes the first access processing when receiving the writing or reading request to the first page on which the first access processing is set to be performed in the second mode.

When the first access processing is not set to be performed on the page (No at S72), that is, when the second access processing is set to be performed thereon, the access processor 28 proceeds with the process to S74. The access processor 28 determines whether the access request is the reading request at S74.

The access processor 28 executes the second access processing at S75 when receiving the reading request (Yes at S74). That is to say, in the second mode, the access processor 28 executes the second access processing when receiving the reading request to the second page on which the second access processing is set to be performed.

The access processor 28 executes the first access processing at S76 when receiving no reading request, that is, receiving the writing request (No at S74). That is to say, in the second mode, the access processor 28 executes the first access processing when receiving the writing request to the second page on which the second access processing is set to be performed. Then, the access processor 28 finishes this flow when completing the processing at S73 or S74.

The access processor 28 may not execute writing instead of the execution of the first access processing at S76. In this case, in the second mode, the access processor 28 does not execute writing when receiving the writing request to the second page on which the second access processing is set to be performed.

When the access method for the page on which the second access processing is set to be performed is changed to the first access processing, finally, the second access processing is set to be performed on no page. In the embodiment, the mode switching unit 70 switches the first mode to the second mode at a stage at which the second access processing is still set to be performed on some pages. The access processor 28 can execute reading by the second access processing in the second mode. The access processor 28, however, executes writing by the first access processing (or not executed) on the page on which the second access processing is set to be performed in the second mode.

The access processor 28 can therefore decrease writing involving switching of the access method in the second mode. The access processor 28 can continue at least reading by the second access processing.

The timing at which the first mode is switched to the second mode may be, for example, a time point when the total number of times of rewriting in the non-volatile memory unit 16 exceeds a predetermined threshold. Alternatively, the switching timing may be a time point when the number of pages for which the access method is changed to the first access processing from the second access processing exceeds a threshold. The switching timing may be a time point when the selectable number of fourth pages becomes lower than a predetermined number of pages. The switching timing may be a time point when any physical quantity exceeds a threshold.

The switching timing may be a time point when a predetermined period of time has passed from the start of usage of the information processing apparatus 10. The switching timing may be a time point when predetermined notification is received from the application or the operating system that the processing circuit 12 executes.

For example, an incorporated apparatus using deep learning in machine learning undergoes training of a deep learning network or a neural network for a constant period from the start of usage of the apparatus. When the information processing apparatus 10 is applied to the above-mentioned apparatus, the processing circuit 12 updates data in the second access processing in order to store pieces of data of the relevant network and the like in the non-volatile memory unit 16 in the training period. The processing circuit 12 does not, however, execute writing into the non-volatile memory unit 16 after the training period is ended.

The processing circuit 12 reads data in the second access processing in order to execute recognition processing even after the training period is ended. Accordingly, the mode switching unit 70 may set the first mode in the training period and set the second mode in a period after the training is ended. The access processor 28 can therefore execute writing into the non-volatile memory unit 16 by the second access processing during the training period and execute reading from the non-volatile memory unit 16 by the second access processing after the training is ended.

Sixth Embodiment

Figure 21:
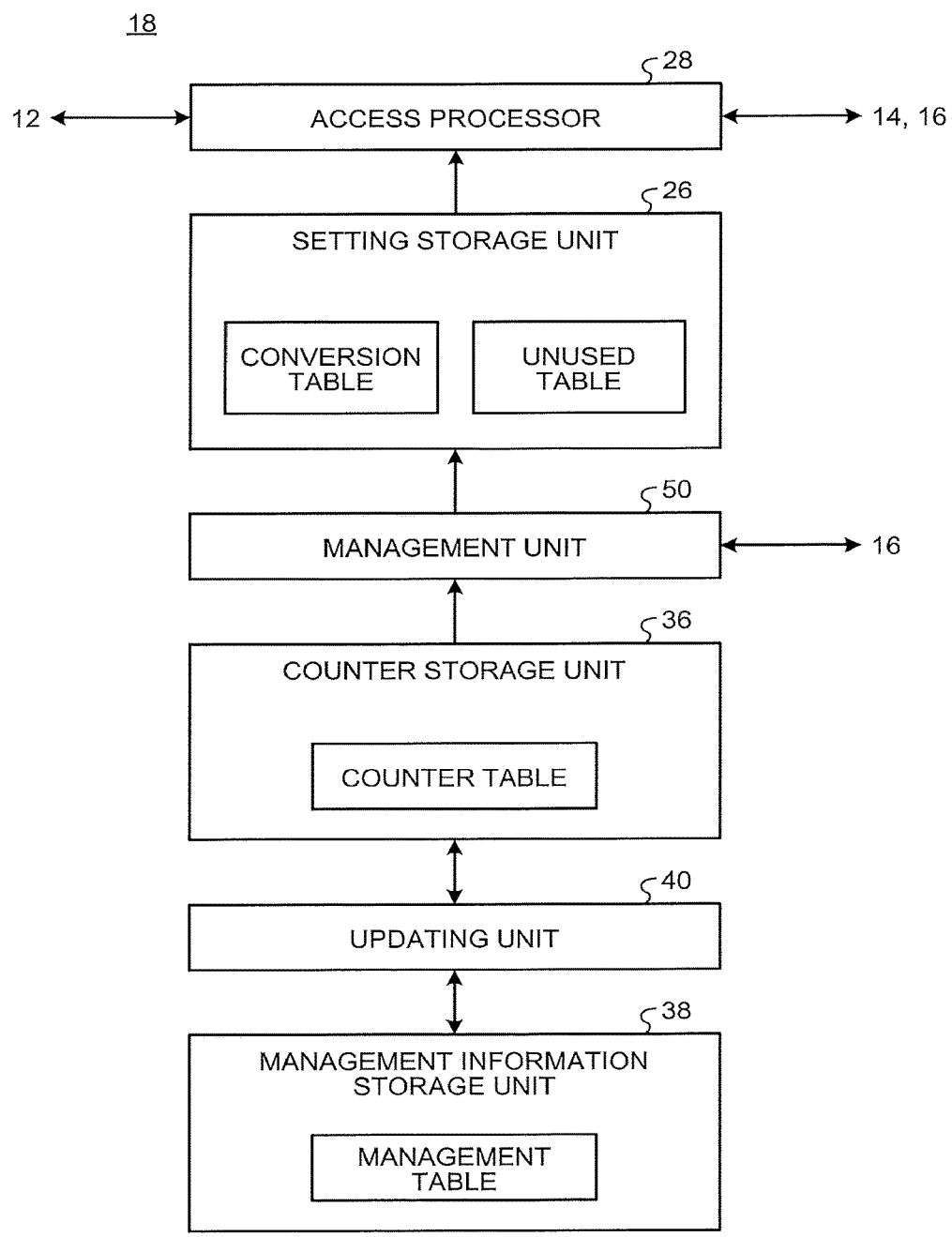
FIG. 21 is a diagram illustrating the configuration of a memory controller according to a sixth embodiment.

FIG. 21 is a diagram illustrating the configuration of the memory controller 18 according to a sixth embodiment. The memory controller 18 in the sixth embodiment further includes a management information storage unit 38.

The management information storage unit 38 stores therein a management table. The management table has a predetermined number of entries. Management information can be stored in each entry. That is to say, the management table can store therein the management information about each of a predetermined number of first regions (pages). The number of pieces of management information capable of being stored in the management table is less than the number of first regions contained in the non-volatile memory unit 16. The management table stores therein the pieces of management information about the first regions (active first regions (active pages)) for which the processing circuit 12 recently accessed the non-volatile memory unit 16. When the entries are all occupied in the management table, new management information is stored in the management table by, for example, deleting the oldest management information (management information that the processing circuit 12 accesses earliest).

The management information indicates whether each of a plurality of second regions (cache lines) contained in the corresponding first region is in a written state or unwritten state. For example, when no data is written into data stored in the corresponding first region, the management information indicates that all of the second regions contained in the corresponding first region are in the unwritten states. When data is written into any of the second regions contained in the first region in which no data has been written, the management information indicates that the second region is made into the written state and the other second regions are made into the unwritten states. The management table and the management information are further described with reference to FIG. 22.

The updating unit 40 updates the counter values stored in the counter table and the pieces of management information stored in the management table. When the processing circuit 12 writes data into the non-volatile memory unit 16, the updating unit 40 acquires management information of the written data and updates the counter value and the management information on the basis of the acquired management information. Specific processing procedures of the updating unit 40 are further described with reference to FIG. 23 and FIG. 24.

FIG. 22 is a diagram illustrating an example of the management table in the sixth embodiment. The management table has the predetermined number of entries to store therein the pieces of management information. In the example of FIG. 22, the management table has 64 entries.

The management information is stored in each entry. The management information contains identification information and map information.

The identification information is a number (page number) for identifying the first region (page) that the management information manages. The updating unit 40 can identify the first region that is managed by the management information stored in the entry by referring to the identification information.

The map information indicates that each of the second regions (cache lines) contained in the corresponding first region are in the written state or unwritten state. The map information contains bits corresponding to the respective second regions (cache lines) contained in the first region (page).

The map information contains, for example, the bits corresponding to cache line numbers. When, for example, one page contains 64 cache lines, the map information contains 64 bits. When each bit is, for example, 1, the corresponding cache line is in the written state. When each bit is, for example, 0, the corresponding cache line is in the unwritten state.

It should be noted that in the management table, the pieces of management information are not necessarily stored in all of the entries. That is to say, the management table may have unused entries.

Figure 23:
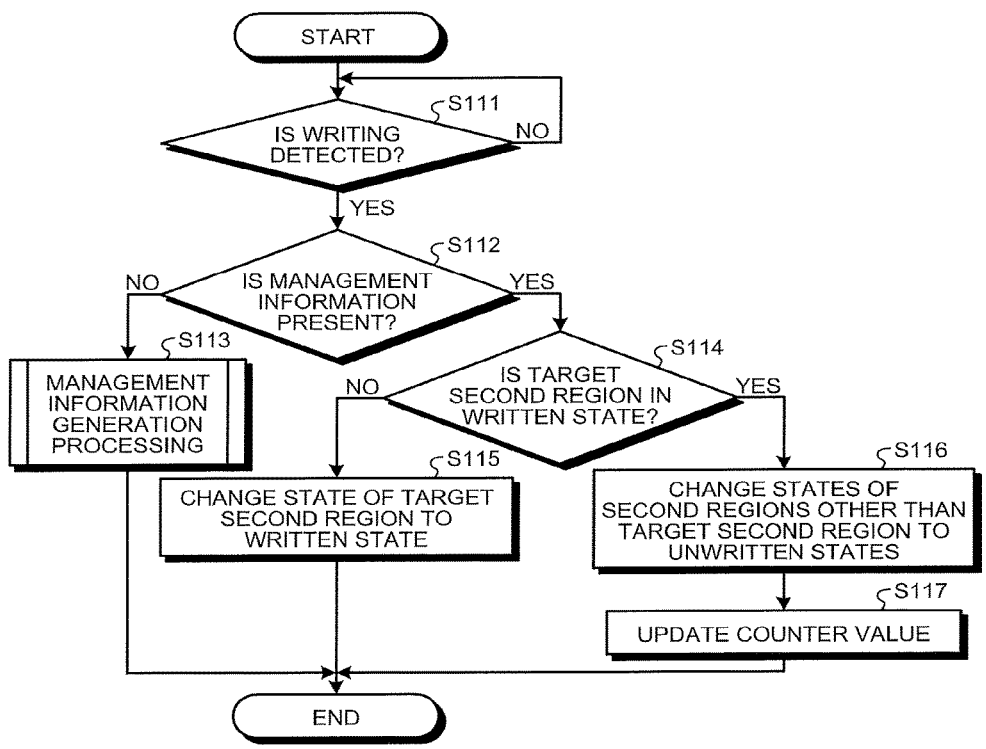
FIG. 23 is a flowchart illustrating flow of processing performed by an updating unit.

FIG. 23 is a flowchart illustrating flow of processing performed by the updating unit 40 in the sixth embodiment. The updating unit 40 updates the counter table and the management table in accordance with the flowcharts illustrated in FIG. 23 and FIG. 24.

First, the updating unit 40 detects whether data is written into the non-volatile memory unit 16 at S111. The updating unit 40 stands by at the process at S111 when no data is written (No at S111) and proceeds with the process to S112 when data is written (Yes at S111).

The updating unit 40 determines whether the management information about a target first region (target page) as the first region into which the data (first data) as a writing target is written is present in the management information at S112. The updating unit 40 determines, for example, whether management information containing the same page number as a page number contained in the address information of the data is stored in the management information.

When the management information about the target first region is not present in the management table, for example, when the management information containing the same page number as the page number contained in the address information is not stored in the management table (No at S112), the updating unit 40 proceeds with the process to S113. The updating unit 40 executes management information generation processing at S113. The management information generation processing is described with reference to FIG. 24. The updating unit 40 finishes this flow and stands by for subsequent writing when completing the management information generation processing.

When the management information about the target first region is present in the management table, for example, when the management information containing the same page number as the page number contained in the address information is stored in the management table (Yes at S112), the updating unit 40 proceeds with the process to S114.

The updating unit 40 determines whether a state of a target second region as a second region into which the first data indicated by the management information about the target first region is written is the written state at S114. The updating unit 40 determines whether the bit corresponding to the cache line number contained in the address information is 1 by referring to the map information in the management information corresponding to the page number contained in the address information.

When the state of the target second region is the unwritten state, for example, when the bit corresponding to the cache line number contained in the address information is 0 (No at S114), the updating unit 40 proceeds with the process to S115. The updating unit 40 changes the state of the target second region indicated by the management information about the target first region to the written state from the unwritten state at S115. The updating unit 40, for example, changes the corresponding bit to 1 from 0. The updating unit 40 can thereby reflect, onto the management table, the state of the non-volatile memory unit 16 after the first data is written. The updating unit 40 finishes this flow and stands by for subsequent writing when completing the processing at S115.

When the state of the target second region indicated by the management information about the target first region is the written state, for example, when the bit corresponding to the cache line number contained in the address information is 1 (Yes at S114), the updating unit 40 proceeds with the process to S116. The updating unit 40 changes the states of the second regions other than the target second region that are indicated by the management information about the target first region to the unwritten states at S116. That is to say, the updating unit 40 sets only the target second region indicated by the management information about the target first region to the written state and sets the other second regions to the unwritten states. The updating unit 40, for example, sets only the corresponding bit to 1 and the other bits to 0.

The updating unit 40 can thereby reflect, onto the management table, the state of the non-volatile memory unit 16 after the first data is written into the target second region.

The updating unit 40 proceeds with the process to S117 when completing the processing at S116. The updating unit 40 updates the counter value for the target first region at S117. The updating unit 40, for example, increments the counter value corresponding to the page number contained in the address information by 1 in the counter table. The updating unit 40 can thereby update the number of times of rewriting in the target first region.

It should be noted that the updating unit 40 may execute the pieces of processing at S116 and S117 reversely. The updating unit 40 finishes this flow and stands by for subsequent writing when completing the pieces of processing at S116 and S117.

Figure 24:
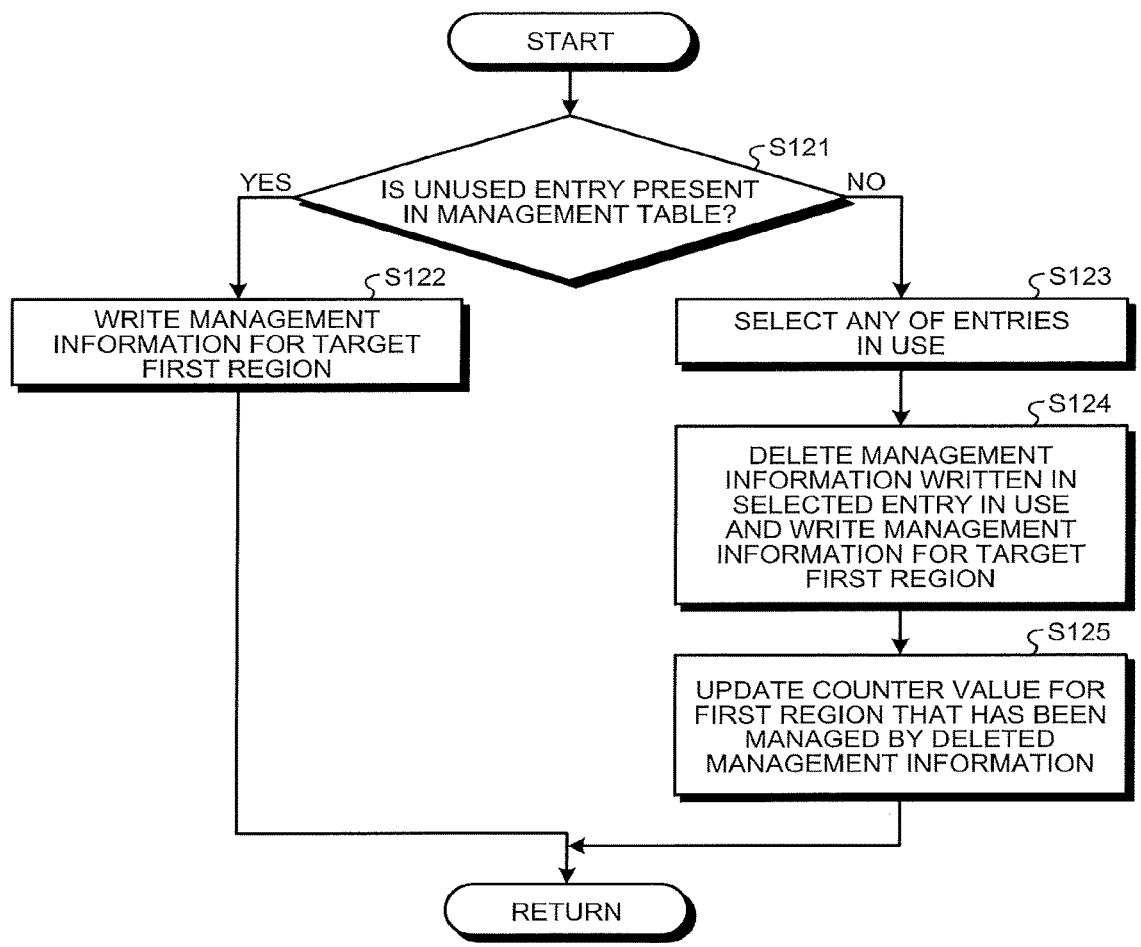
FIG. 24 is a flowchart illustrating flow of management information generation processing performed by the updating unit.

FIG. 24 is a flowchart illustrating flow of the management information generation processing performed by the updating unit 40 in the sixth embodiment. The updating unit 40 executes pieces of processing at S121 to S125 illustrated in FIG. 24 in the management information generation processing at S113 in FIG. 23.

First, the updating unit 40 determines whether an unused entry is present in the management table at S121. That is to say, the updating unit 40 determines whether the entry storing no management information is present in the management table.

When the unused entry is present (Yes at S121), the updating unit 40 proceeds with the process to S122. The updating unit 40 writes the management information about the target first region into the unused entry at S122. That is to say, the updating unit 40 writes, into the unused entry, the management information containing the identification information for identifying the target first region and the map information indicating that only the target second region is in the written state and the other second regions are in the unwritten states. The updating unit 40, for example, writes, into the unused entry, the page number contained in the address information and the map information indicating that only the bit corresponding to the cache line number contained in the address information is set to 1 and the other bits are set to 0.

The updating unit 40 can thereby reflect, onto the management table, the state of the non-volatile memory unit 16 after the first data is written. The updating unit 40 returns the process to the flow in FIG. 23 when completing the processing at S122.

When no unused entry is present (No at S121), the updating unit 40 proceeds with the process to S123. The updating unit 40 selects any of the entries in use from the management table at S123. The updating unit 40, for example, selects the entry in use that stores therein the oldest management information. It should be noted that the updating unit 40 may select any of the entries in use in accordance with another algorithm.

The updating unit 40 proceeds with the process to S124 when completing the processing at S123. The updating unit 40 deletes the management information written into the selected entry in use and writes the management information about the target first region therein at S124. That is to say, the updating unit 40 overwrites, into the selected entry in use, the management information containing the identification information for identifying the target first region and the map information indicating that only the target second region is in the written state and the other second regions are in the unwritten states. The updating unit 40, for example, overwrites, into the selected entry in use, the page number contained in the address information and the map information indicating that only the bit corresponding to the cache line number contained in the address information is set to 1 and the other bits are set to 0.

The updating unit 40 can delete the selected management information (for example, the oldest management information) from the management table, and store new management information in the management table. The updating unit 40 can thereby reflect, onto the management table, the state of the non-volatile memory unit 16 after the first data is written.

The updating unit 40 proceeds with the process to S125 when completing the processing at S124. The updating unit 40 updates the counter value for the first region that has been managed by the management information deleted from the management table at S125. The updating unit 40, for example, increments the counter value corresponding to the page number contained in the management information that is deleted by 1 in the counter table.

The updating unit 40 can update the number of times of rewriting while data is assumed to be added to the first region for which management using the management table has finished by executing the processing at S125. The updating unit 40 can therefore estimate the number of times of rewriting in the first region that is not actively managed by the management table.

It should be noted that the updating unit 40 may execute the pieces of processing at S124 and S125 reversely. The updating unit 40 returns the process to the flow in FIG. 23 when completing the pieces of processing at S124 and S125.

As described above, the information processing apparatus 10 in the embodiment stores therein the pieces of management information of which the number is less than the number of first regions (pages) contained in the non-volatile memory unit 16. The information processing apparatus 10 in the embodiment can therefore reduce the number of entries in the management table, thereby reducing the storage capacity of the management information storage unit 38.

Furthermore, the information processing apparatus 10 in the embodiment updates the counter value for the first region that is not managed by the management table at the timing when the management information is deleted from the management table. The information processing apparatus 10 in the embodiment can therefore estimate the numbers of times of rewriting for all of the first regions (pages) contained in the non-volatile memory unit 16 with high accuracy.

Modifications

Figure 25:
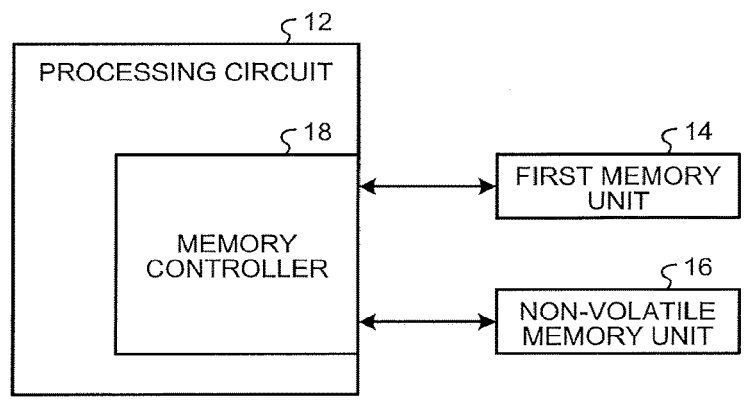
FIG. 25 is a diagram illustrating a first modification of the configuration of the information processing apparatus.

FIG. 25 is a diagram illustrating a first modification of the configuration of the information processing apparatus 10. The processing circuit 12 in the first modification, for example, includes the memory controller 18. The first memory unit 14 and the non-volatile memory unit 16 in the first modification are provided at the outside of the processing circuit 12.

Figure 26:
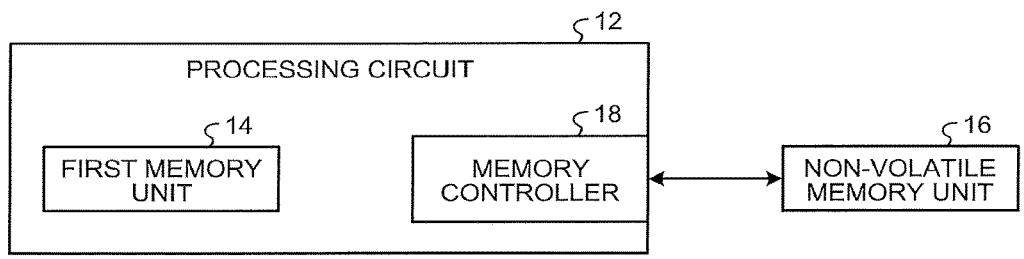
FIG. 26 is a diagram illustrating a second modification of the configuration of the information processing apparatus.

FIG. 26 is a diagram illustrating a second modification of the configuration of the information processing apparatus 10. The processing circuit 12 in the second modification, for example, includes the memory controller 18. The processing circuit 12 in the second modification also includes the first memory unit 14. The first memory unit 14 may be, for example, a static random access memory (SRAM) in a processor.

Figure 27:
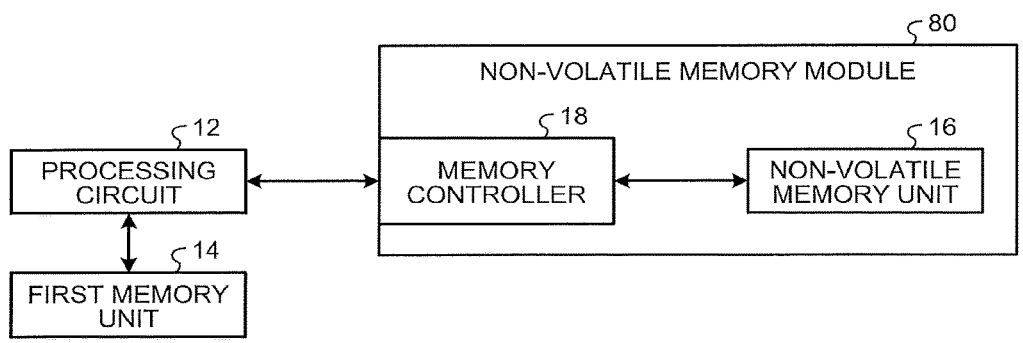
FIG. 27 is a diagram illustrating a third modification of the configuration of the information processing apparatus.

FIG. 27 is a diagram illustrating a third modification of the configuration of the information processing apparatus 10. The information processing apparatus 10 may include the processing circuit 12 and a non-volatile memory module 80. In this case, the non-volatile memory module 80 includes the non-volatile memory unit 16 and the memory controller 18.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A management device that manages reading and writing of data, by a processing circuit, from and into a first memory unit and a non-volatile memory unit containing a plurality of pages, the management device comprising:
  a setting storage unit configured to store therein an access method indicating whether first access processing of writing and reading data into and from data transferred to the first memory unit from the non-volatile memory unit or second access processing of directly writing and reading data into and from data stored in the non-volatile memory unit is executed for each of the pages;
  an access processing circuit configured to execute the first access processing when receiving a writing or reading request to a first page on which the first access processing is set to be performed and execute the second access processing when receiving a writing or reading request to a second page on which the second access processing is set to be performed; and
  a management circuit configured to change an access method for a third page on which the second access processing is set to be performed to the first access processing from the second access processing when quality of the third page is equal to or lower than a reference value.

2. The device according to claim 1, wherein
  the access processing circuit is configured to
  reads and writes data from and into data transferred to the first memory unit from the first page in the non-volatile memory unit and writes the data transferred to the first memory unit back to the non-volatile memory unit in the first access processing, and
  directly reads and writes data from and into the second page in the non-volatile memory unit in the second access processing.

3. The device according to claim 1, wherein the management circuit is configured to move data stored in the third page to a fourth page on which the second access processing is set to be performed when the quality of the third page is equal to or lower than the reference value.

4. The device according to claim 3, wherein
  the setting storage unit is configured to store therein a request address requested by the processing circuit for each of pages from or into which the processing circuit has read or written data, and
  the management circuit is configured to
    correlate, to the fourth page, the request address correlated to the third page, and
    change the third page to an unused page to which no request address is correlated.

5. The device according to claim 1, wherein the management circuit is configured to change the access method for the third page to the first access processing from the second access processing when number of times of rewriting in the third page is equal to or more than a predetermined value.

6. The device according to claim 1, wherein the management circuit is configured to change the access method for the third page to the first access processing from the second access processing when number of error bits of data read from the third page is equal to or more than a predetermined value.

7. The device according to claim 3, further comprising a counter storage unit configured to store therein number of times of rewriting for each of the pages contained in the non-volatile memory unit, wherein
  the management circuit selects, as the fourth page, a page on which the second access processing is set to be performed, that is unused, and in which the number of times of rewriting satisfies a predetermined reference.

8. The device according to claim 1, wherein the access processing circuit is configured to write back, in the first access processing, the data that is transferred to the first memory unit from the non-volatile memory unit to an unused page to which no request address is correlated, on which the first access processing is set to be performed, and in which number of times of rewriting is equal to or less than a predetermined value in the first access processing.

9. The device according to claim 1, wherein
  each of the pages contains a plurality of sub pages,
  the setting storage unit is configured to store therein, for each of the pages, either of an access method for the entire page or an access method for each of the contained sub pages, and
  the management circuit is configured to
    move, to a second sub page on which the second access processing is set to be performed, data stored in a first sub page of which quality is equal to or lower than a reference value among the sub pages contained in the third page on which the second access processing is set to be performed for the entire page, when the quality of the third page is equal to or lower than the reference value;
    set, to the first access processing, an access method for the first sub page; and
    set, to the second access processing, an access method for each of the sub pages other than the first sub page that are contained in the third page.

10. The device according to claim 9, wherein
  the setting storage unit is configured to store therein a corresponding request address for each of pages or each of sub pages from or into which the processing circuit has read or written data, and
  the management circuit is configured to
    correlate, to the second sub page, the request address correlated to the first sub page,
    correlate the corresponding request address to each of the sub pages other than the first sub page in the third page, and
    change the first sub page to an unused sub page to which no request address is correlated.

11. The device according to claim 3, wherein
  the non-volatile memory unit includes a plurality of element memories that are capable of individually replaced and to which priorities are set, and
  the management circuit is configured to
    select the element memory in which number of times of rewriting satisfies predetermined conditions and that has highest priority from the element memories, and
    select the fourth page from the selected element memory.

12. The device according to claim 1, wherein
  in a first period before the management device reaches a predetermined state, the access processing circuit is configured to execute the first access processing when receiving the writing or reading request to the first page on which the first access processing is set to be performed, and execute the second access processing when receiving the writing or reading request to the second page on which the second access processing is set to be performed, and in a second period after the management device reaches the predetermined state, the access processing circuit is configured to execute the first access processing when receiving the writing or reading request to the first page on which the first access processing is set to be performed, execute the first access processing when receiving the writing request to the second page on which the second access processing is set to be performed, and execute the second access processing when receiving the reading request to the second page on which the second access processing is set to be performed.

13. The device according to claim 1, wherein in a first period before the management device reaches a predetermined state, the access processing circuit is configured to execute the first access processing when receiving the writing or reading request to the first page on which the first access processing is set to be performed, and execute the second access processing when receiving the writing or reading request to the second page on which the second access processing is set to be performed, and in a second period after the management device reaches the predetermined state, the access processing circuit is configured to execute the first access processing when receiving the writing or reading request to the first page on which the first access processing is set to be performed, do not execute writing when receiving the writing request to the second page on which the second access processing is set to be performed, and execute the second access processing when receiving the reading request to the second page on which the second access processing is set to be performed.

14. The device according to claim 5, further comprising:

a counter storage unit configured to store therein a counter value for each of the pages contained in the non-volatile memory unit;

a management information storage unit configured to store therein a management table capable of storing therein management information for each of a predetermined number of pages; and an updating circuit configured to update the counter value and the management table, wherein each of the pages contains a plurality of second regions, the management information indicates whether each of the second regions contained in a corresponding page is in a written state or an unwritten state, and in response to writing of first data into the non-volatile memory unit, the updating circuit is configured to change a state of a target second region as a second region into which the first data is written to the written state when the state of the target second region that is indicated by the management information for a certain target page as a page into which the first data is written is the unwritten state, and update the counter value for the target page when the state of the target second region that is indicated by the management information is the written state.

15. The device according to claim 1, wherein the access processing circuit is configured to in a first period before the management device reaches a predetermined state, the data is written into the non-volatile memory unit by a size of the page or a size that is smaller than the page, and in a second period after the management device reaches the predetermined state, the data is written into the non-volatile memory unit by the size of the page.

16. The device according to claim 15, wherein in the first period, the processing circuit is configured to execute training in machine learning, and in the second period, the processing circuit is configured to execute recognition processing using data provided by the training in the machine learning.

17. An information processing apparatus comprising:

a processing circuit;

a first memory unit configured to be subject to reading and writing of data by the processing circuit;

a non-volatile memory unit configured to be subject to reading and writing of data by the processing circuit and contain a plurality of pages;

a setting storage unit configured to store therein an access method indicating whether first access processing of writing and reading data into and from data transferred to the first memory unit from the non-volatile memory unit or second access processing of directly writing and reading data into and from data stored in the non-volatile memory unit is executed for each of the pages;

an access processing circuit configured to execute the first access processing when receiving a writing or reading request to a first page on which the first access processing is set to be performed and execute the second access processing when receiving a writing or reading request to a second page on which the second access processing is set to be performed; and a management circuit configured to change an access method for a third page on which the second access processing is set to be performed to the first access processing from the second access processing when quality of the third page is equal to or lower than a reference value.

18. A management method in a management device that manages reading and writing of data, by a processing circuit, from and into a first memory unit and a non-volatile memory unit containing a plurality of pages, the management device including:

a setting storage unit configured to store therein an access method indicating whether first access processing of writing and reading data into and from data transferred to the first memory unit from the non-volatile memory unit or second access processing of directly writing and reading data into and from data stored in the non-volatile memory unit is executed for each of the pages, and an access processing circuit configured to execute the first access processing when receiving a writing or reading request to a first page on which the first access processing is set to be performed and execute the second access processing when receiving a writing or reading request to a second page on which the second access processing is set to be performed, the management method comprising changing an access method for a third page on which the second access processing is set to be performed to the first access processing from the second access processing when quality of the third page is equal to or lower than a reference value.

\* \* \* \* \*